United States Patent [19]
Tanaka et al.

[11] Patent Number: 5,878,589
[45] Date of Patent: Mar. 9, 1999

[54] VEHICULAR AIR CONDITIONING SYSTEM FOR ELECTRIC VEHICLES

[75] Inventors: Masaya Tanaka, Anjo; Takahisa Suzuki, Kariya; Kunio Iritani; Katsuya Ishii, both of Anjo; Keiichiro Banzai, Toyota, all of Japan

[73] Assignee: Denso Corporation, Kariya, Japan

[21] Appl. No.: 838,708

[22] Filed: Apr. 9, 1997

[30] Foreign Application Priority Data

Apr. 10, 1996 [JP] Japan .................................. 8-088557
Apr. 24, 1996 [JP] Japan .................................. 8-102965
Nov. 28, 1996 [JP] Japan .................................. 8-318240

[51] Int. Cl.$^6$ .................................. F25B 5/00; F28F 7/00
[52] U.S. Cl. .......................... 62/199; 62/259.2; 165/80.2
[58] Field of Search .................................. 62/259.2, 160; 165/80.2; 180/65.1

[56] References Cited

U.S. PATENT DOCUMENTS 5,483,807  1/1996  Abersfelder et al. ..................... 62/435

FOREIGN PATENT DOCUMENTS 405157372  6/1993  Japan ..................................... 62/259.2
406034208  2/1994  Japan ..................................... 62/259.2

*Primary Examiner*—William Wayner
*Attorney, Agent, or Firm*—Harness, Dickey & Pierce, PLC

[57] ABSTRACT

The waste heat from a heating part mounted on a vehicle is recovered and extracted by a refrigerant for gas injection so that the heating capacity at a low ambient temperature may be effectively improved while suppressing an increase in the power consumption. At the heating time, the refrigerant is circulated in a closed circuit composed of a compressor, an indoor heat exchanger, a pressure regulator and an outdoor heat exchanger, and the refrigerant, as condensed in the indoor heat exchanger, is regulated to an intermediate pressure by a pressure regulator and introduced into a heat exchanger. In this heat exchanger, the refrigerant extracts the heat from the heating part at the side of the vehicle so that it evaporates. The refrigerant thus having evaporated is introduced through an evaporation pressure regulating valve via a gas injection passage into a gas injection port of the compressor.

26 Claims, 19 Drawing Sheets

→ H: HEATING
---→ C: COOLING

| VALVE MODE | 21 | 33a | 33b |
|---|---|---|---|
| COOLING | COOLING | CLOSED | OPEN |
| HEATING | HEATING | OPEN | CLOSED |
| DEHUMIDIFYING | HEATING | CLOSED | OPEN |

C: COOLING
H: HEATING
D: DEHUMIDIFYING

| VALVE MODE | 123 | 128a | 128b |
|---|---|---|---|
| COOLING | COOLING | CLOSED | OPEN |
| HEATING | HEATING | OPEN | CLOSED |
| DEHUMIDI-FYING | HEATING | CLOSED | OPEN |

——— EMBODIMENT
—·—·— GAS INJECTION
------- PRIOR ART

| VALVE MODE | 123 | 128a | 128c |
|---|---|---|---|
| COOLING | COOLING | CLOSED | CLOSED |
| HEATING | HEATING | OPEN | CLOSED |
| DEHUMIDIFYING | HEATING | CLOSED | OPEN |

— EMBODIMENT
—·— GAS INJECTION
------ PRIOR ART

VEHICULAR AIR CONDITIONING SYSTEM FOR ELECTRIC VEHICLES

CROSS REFERENCE TO RELATED APPLICATION

This application is based on and claims priorities of Japanese Patent Applications No. 8-88557 filed on Apr. 10, 1996, No. 8-102965 filed on Apr. 24, 1996 and No. 8-318240 filed on Nov. 28, 1996, the contents of which are incorporated herein by reference.

BACKGROUND OF THE INVENTION

1. Field of the Invention

The present invention relates to a vehicular air conditioner system having a function to recover the waste heat of a heating part such as a driving device and, more particularly, to a vehicular air conditioner system which is improved in the heating capacitance at a low ambient temperature by making a gas injection cycle in a heat pump system capable of at least heating. The present invention is suitable as an air conditioning heat pump system for an electric car for arctic areas and a hybrid car equipped with both an electric motor and an internal combustion engine as its prime mover.

2. Description of Related Art

When a heat pump system using an electric compressor is to be mounted on a vehicle such as an electric car, it is necessary for retaining safety of the vehicle drive to defrost the windshield or to prevent it from becoming misty. In Japanese Patent laid-Open No. 5-319077, therefore, there has been proposed a system which is enabled by providing a cooling-dedicated evaporator and a heating-dedicated evaporator independently of each other as a compartment heat exchanger to prevent the windshield from being clouded with the condensed water due to an abrupt evaporation at the time of changing the mode from the cooling to the heating modes and to dehumidify and heat the conditioned air by heating the air again to a desired temperature with the heating-dedicated condenser while dehumidifying it with the cooling-dedicated evaporator.

According to the aforementioned system of the prior art, however, when the ambient temperature in the circumstances using the system lowers, the heat extraction in an outdoor heat exchanger acting as the evaporator at the heating time is reduced to lower the suction pressure of a compressor so that the capacity to the refrigerant is enlarged to reduce the refrigerant circulation, thus raising a problem that the heating capacity lowers.

When the compressor suction pressure drops, moreover, the compression ratio rises to raise the refrigerant discharge temperature so that the compressor cannot be used with its maximum capacity (or highest RPM) for protecting it. This raises a problem that the heating capacity is further lowered.

From this reasoning, the aforementioned system of the prior art is short of the compartment heating capacity in an arctic area having an ambient temperature of −10° C. or less.

In Japanese Patent Laid-Open No. 54-140247, in order to improve the heating capacity at a low ambient temperature, there has also been proposed an air conditioner which is equipped with a vapor-liquid separator for separating the vapor and liquid of the refrigerant, as regulated to an intermediate pressure, to construct a gas injection type heat pump for injecting the gas refrigerant, as separated by the vapor-liquid separator, into the compression stroke of the compressor and which is further equipped with an auxiliary heat exchanger disposed upstream of the vapor-liquid separator for heating the refrigerant with the air.

In the electric car, however, there is generally adopted a cooling system for cooling a semiconductor switching element or the like of an RPM controlling inverter of a vehicular driving electric motor. In this system, the waste heat of the heating part is extracted to the cooling water, and this cooling water is circulated in a radiator by a water pump so that the waste heat may be released to the atmosphere by the radiator. However, this system has the complicated construction for the heat release through the circulation of the cooling water and requires such a large space for mounting it on the vehicle as to be troubled by retaining the space.

Because the heat pump of the prior art has an ordinary construction, moreover, only one indoor heat exchanger is disposed for both the cooling and heating operations. This heat exchanger cannot exhibit the dehumidifying heating function to heat again the dehumidified conditioned air to a desired temperature. Under a running condition in which the air to be sucked has a high humidity, therefore, there arises a problem that the windshield is liable to become misty.

Since the refrigerant is heated by the auxiliary heat exchanger of an air heat source, on the other hand, the refrigerant heating effect cannot be fully exhibited at the low ambient temperature so that a sufficient heating capacity cannot be expected.

SUMMARY OF THE INVENTION

The present invention therefore has an object to provide a vehicular air conditioner system which can improve the heating capacity at a low ambient temperature effectively while suppressing the power consumption.

The present invention has another object to provide a vehicular air conditioner system capable of achieving the cooling of a heating part, as mounted on the vehicle, in a simple construction.

The present invention has a further object to improve the heating capacity at the low ambient temperature effectively while suppressing the power consumption, by noting the waste heat coming from the vehicle-mounted heating part, e.g., the semiconductor switches of an RPM controlling inverter of a vehicle driving electric motor and by recovering the waste heat to transfer it to an intermediate pressure refrigerant for gas injection.

The present invention has a still further object to improve the heating capacity of a heat pump system for dehumidifying heating operation at the low ambient temperature, effectively while suppressing the power consumption by providing a cooling-dedicated evaporator and a heating-dedicated condenser independently of each other as the indoor heat exchanger.

According to the present invention, a vehicular air conditioning system is constructed to restore the waste heat generated from heating part (heat generating part, e.g., the semiconductor switch element of the RPM controlling inverter of the vehicle driving electric motor) in a vehicle at a point midway of a gas injection passage connected to a compressor, by noting the waste heat coming from the heating part. Thus, the heating capacity at the low ambient temperature is improved by recovering and extracting the waste heat directly to the gas injection intermediate pressure refrigerant. Moreover, the cycle is made of the heat exchanger for recovering and extracting the waste heat from a vehicle-mounted heating part directly to the refrigerant, so that the heating part can be cooled with the simple construction.

More specifically, according to a first aspect of the present invention, a compressor is provided with an intake port for sucking the refrigerant at a low pressure side of a refrigerating cycle, a gas injection port for introducing the gas refrigerant of an intermediate pressure of the refrigerating cycle, and a discharge port for discharging the compressed refrigerant. A first pressure regulator for regulating the refrigerant is interposed between an indoor heat exchanger and an outdoor heat exchanger. The condensed refrigerant at a high pressure side of the refrigerating cycle is regulated to the intermediate pressure by a second pressure regulator. This intermediate pressure refrigerant is caused to extract the heat of a heating part, as mounted on the vehicle, and to evaporate by a heat exchanger. The gas refrigerant, as evaporated by the heat exchanger is introduced into the gas injection port through a gas injection passage.

At the heating time, the gas is injected in the course of the compression stroke of the compressor, so that the flow rate of the injected gas refrigerant is added to the flow rate of the sucked refrigerant of the compressor to increase the flow rate of the refrigerant to an indoor heat exchanger or condenser, and the waste heat of each heating part is recovered or extracted in the heat exchanger to the intermediate pressure liquid refrigerant so that the intermediate pressure refrigerant is evaporated and injected into the compressor. As a result, the heat release of the refrigerant in the indoor heat exchanger or condenser can be increased to raise the heating capacity.

Moreover, the intermediate pressure refrigerant is evaporated by the waste heat of each heating part and injected into the compressor. As a result, the compressor may compress the refrigerant to be injected from the intermediate pressure to the discharge pressure but not from the suction pressure to the discharge pressure unlike the ordinary cycle of the prior art. Therefore, the average suction pressure in the compressor can rise to reduce the compression ratio so that the compression power can be suppressed to increase the resulting performance coefficient. As a result, the cycle efficiency can be improved together with the heating capacity while suppressing the power consumption.

In either of the cooling and heating modes, moreover, in the heat exchanger, each heating part can be directly cooled with the refrigerant so that the construction can be drastically simplified as compared with the cooling system having the cooling water circulating circuit of the prior art.

According to a second aspect of the invention, the condensed refrigerant at the high pressure side of the refrigerating cycle is regulated to the intermediate pressure by a first pressure regulator so that the vapor and liquid of the intermediate pressure refrigerant are separated by a vapor-liquid separator, and the gas refrigerant, as separated by the vapor-liquid separator is introduced through a second pressure regulator via a first gas injection passage into the gas injection port of the compressor.

Moreover, the liquid refrigerant, as separated by the vapor-liquid separator, is regulated by a third pressure regulator and fed to an indoor heat exchanger or an outdoor heat exchanger, and the liquid refrigerant, as separated by the vapor-liquid separator, is regulated by a fourth pressure regulator and fed to a heat exchanger. In this heat exchanger, the refrigerant extracts the heat from a vehicle-mounted heating part and evaporates so that the gas refrigerant, as evaporated in the heat exchanger, is introduced via a second gas injection passage into the gas injection port.

As a result, it is also possible to improve the heating capacity effectively and to simplify the construction of the heating part cooling system drastically. In addition, by injecting the gas refrigerant, as separated by the vapor-liquid separator, directly via the first gas injection passage, the enthalpy difference between the refrigerants to flow through the heat exchanger for cooling the heating part and through the indoor heat exchanger can be enlarged so that the cycle efficiency can be further improved.

According to a third aspect of the invention, the condensed refrigerant at the high pressure side of the refrigerating cycle is regulated to the intermediate pressure by the first pressure regulator so that this intermediate pressure refrigerant is introduced into the heat exchanger. In this heat exchanger, the refrigerant extracts the heat from the vehicle-mounted heating part. The vapor and liquid of the refrigerant, as heated by the heat exchanger, are separated by the vapor-liquid separator so that the liquid refrigerant, as separated, is regulated by the third pressure regulator and fed to the indoor heat exchanger or the outdoor heat exchanger, whereas the gas refrigerant, as separated by the vapor-liquid separator, is injected through the second pressure regulator via the gas injection passage into the gas injection port of the compressor.

As a result, it is also possible to improve the heating capacity effectively and to simplify the construction of the heating part cooling system drastically.

According to a fourth aspect of the invention, the evaporator for cooling the air is disposed in the air conditioning duct, and the evaporator for exchanging the heat with the outside air to condense the refrigerant is disposed outside of the air conditioning duct. In this cooling refrigerating cycle, the intermediate pressure refrigerant is heated to evaporate in the heat exchanger by the vehicle-mounted heating part, and the evaporated gas refrigerant is introduced via the gas injection passage into the gas injection port. As a result, the cooling refrigerating cycle can be utilized to cool the heating part satisfactorily and to simplify the construction of the heating part cooling system drastically.

As a result, at both the cooling time and at the time disusing the cooling mode, the heating part can be satisfactorily cooled by utilizing the cooling refrigerating cycle.

According to a fifth aspect of the invention, the condensed refrigerant at a high pressure side of the refrigerating cycle is regulated to an intermediate pressure by a first pressure regulator, and the vapor and liquid of the intermediate pressure refrigerant are separated by a vapor-liquid separator, so that the gas refrigerant, as separated by the vapor-liquid separator, is introduced via a gas injection passage into a gas injection port of a compressor. Further provided is a heat exchanger for extracting the waste heat of a vehicle-mounted heating part to the intermediate pressure refrigerant.

At the heating time, the refrigerant circulates through the compressor, the indoor heat exchanger, the first pressure regulator, the vapor-liquid separator, the second pressure regulator and the outdoor heat exchanger sequentially and is separated by the vapor-liquid separator, and the gas refrigerant having extracted the waste heat from the heating part is introduced via the gas injection passage into the gas injection port.

As a result, at the heating time, the gas is injected in the course of the compression stroke of the compressor, and the waste heat of the vehicle-mounted heating part is recovered and extracted to the intermediate pressure refrigerant, so that the saturation pressure of the intermediate pressure refrigerant can be raised to increase the gas injection. As a result, the refrigerant circulation to the indoor heat exchanger can be increased to improve the heating capacity effectively.

Simultaneously with this, the saturated gas refrigerant is injected in the course of the compression stroke of the compressor so that the gas refrigerant, as compressed and heated till midway, is cooled by the saturated gas refrigerant to lower the temperature of the refrigerant to be discharged. As a result, the compressor can be used with its highest ability (or highest RPM). As a result, it is possible to improve the heating capacity effectively at the low ambient temperature.

By the heat extraction through the recovery of the waste heat from the heating part, the saturated gas pressure of the intermediate pressure refrigerant can be raised to raise the average suction pressure of the compressor to reduce the compression ratio. As a result, the compression power can be suppressed to increase the resulting performance coefficient so that the cycle efficiency can be improved together with the heating capacity while suppressing the power consumption.

According to a sixth aspect of the invention, there is provided a vapor-liquid separator for separating the vapor and liquid of the evaporated refrigerant at the low pressure side of the refrigerating cycle. The gas refrigerant, as separated by the vapor-liquid separator, is sucked into the intake port of the compressor, and the condensed refrigerant at the high pressure side of the refrigerating cycle is regulated to the intermediate pressure by a first pressure regulator so that this intermediate pressure refrigerant and the medium, as heated by the heating part, may exchange the heat in the heat exchanger.

The intermediate pressure gas refrigerant, as evaporated by the heat extraction in the heat exchanger, is introduced via the gas injection passage into the gas injection port of the compressor. A second pressure regulator for regulating the condensed refrigerant at the high pressure side of the refrigerating cycle is arranged in parallel with the first pressure regulator, and the heat exchanger and the radiator are connected in parallel with the heating part. Change means is provided for changing the flow of the medium between the heat exchanger and the radiator.

At the heating time, the medium is guided to the heat exchanger by the change means, and the refrigerant circulates through the compressor, the indoor heat exchanger, the second pressure regulator, the outdoor heat exchanger and the vapor-liquid separator sequentially. Moreover, the refrigerant, as condensed by the indoor heat exchanger, is regulated to the intermediate pressure by the first pressure regulator, and this intermediate pressure refrigerant is heated and evaporated into the gas refrigerant by the heat exchanger, so that the gas refrigerant is introduced via the gas injection passage into the gas injection port.

As a result, by executing the gas injection recovering the waste heat of the heating part, the heating capacity at a low ambient temperature can be effectively improved. At the same time, the compression ratio can be reduced to suppress the compression power thereby to improve the heating capacity and the cycle efficiency while suppressing the power consumption.

Moreover, the intermediate pressure vapor-liquid separator may be eliminated and replaced by the cycle construction having the vapor-liquid separator at the suction side of the compressor so that the function of the gas injection can be exhibited. As a result, the vapor-liquid separator to be used at the suction side can have a lower pressure resistance and a lower cost than that of the intermediate pressure vapor-liquid separator.

Moreover, the medium flow can be changed by the change means between the heat exchanger and the radiator so that the recovery of the waste heat of the heating part in the heat exchanger means can be selected at any time according to the cycle running condition or the like.

BRIEF DESCRIPTION OF THE DRAWINGS

Other objects, features and advantages of the present invention will become more apparent from the following detailed description when read with reference to the accompanying drawings, in which.

DETAILED DESCRIPTION OF PRESENTLY PREFERRED EMBODIMENTS

Figures 1, 9:
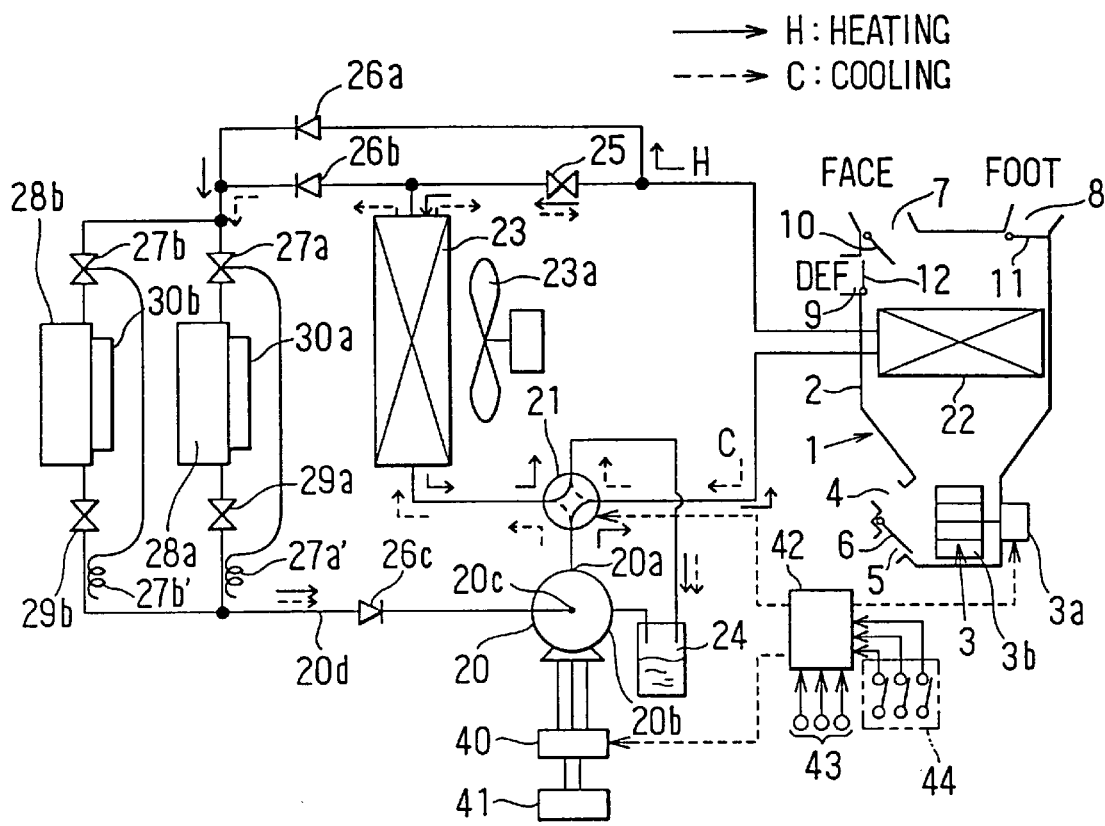
FIG. 1 is a refrigerating cycle diagram showing a first embodiment of the present invention.
FIG. 9 is a diagram enumerating the operating states of valves in the sixth embodiment.

The embodiments of the present invention will be described with reference to the accompanying drawings in which the same reference numerals designate the same or similar parts.

First Embodiment

FIG. 1 shows a first embodiment in which the present invention is applied to an air conditioner for an electric car. An air conditioner unit 1 is an indoor unit which is mounted in the compartment of the electric car, and its air conditioning duct 2 forms an air conditioning duct for introducing the conditioned air into the compartment. The air conditioning duct 2 is equipped at its one end side with inlet ports 4 and 5 for inhaling the inside and outside air. The inside air inlet port 4 and the outside air inlet port 5 are opened/closed by an inside/outside air changing door 6.

Adjacent to the inlet ports 4 and 5, there is arranged a blower 3 for blowing the air into the air conditioning duct 2. This blower 3 is composed of a motor 3a and a centrifugal fan 3b to be driven by the motor 3a. In the other end side of the air conditioning duct 2, on the other hand, there are formed a plurality of air outlets communicating with the inside of the compartment, that is: a face outlet 7 for blowing the conditioned air toward the upper half of the passenger in the compartment; a foot outlet 8 for blowing the conditioned air toward the feet of the passenger in the compartment; and a defroster outlet 9 for blowing the conditioned air onto the inner face of the windshield of the vehicle. The air passages of these outlets 7, 8 and 9 are opened/closed by doors 10 to 12, respectively.

In the air conditioning duct 2 downstream of the air flow of the blower 3, on the other hand, there is arranged an indoor heat exchanger 22 for the refrigerating cycle. This indoor heat exchanger 22 exchanges the heat between the refrigerant in the refrigerating cycle and the air to cool or heat the air.

The refrigerating cycle of FIG. 1 is made as a heat pump type refrigerating cycle for cooling and heating the inside of the compartment by the indoor heat exchanger 22, and is provided with the following devices in addition to the indoor heat exchanger 22.

Specifically, the refrigerating cycle is further provided with: a refrigerant compressor 20; a solenoid four-way valve 21 for changing the flows of refrigerant between the cooling time and the heating time; an outdoor heat exchanger 23 for exchanging the heat with the outside air, as blown from an electric outdoor fan 23a; an accumulator 24 performing functions to separate the vapor and liquid of the refrigerant and to reserve the liquid refrigerant; a pressure regulator 25 for expanding the refrigerant under a reduced pressure; check valves 26a to 26c; heat exchangers 28a and 28b acting as coolers for cooling heating parts 30a and 30b mounted on the vehicle; pressure regulators 27a and 27b for reducing the pressure and expanding the refrigerant to flow into the heat exchangers 28a and 28b; and evaporation pressure regulating valves (or throttle means) 29a and 29b for regulating the refrigerant evaporation pressures (or refrigerant evaporation temperatures) of the heat exchangers 28a and 28b.

Figure 2A:
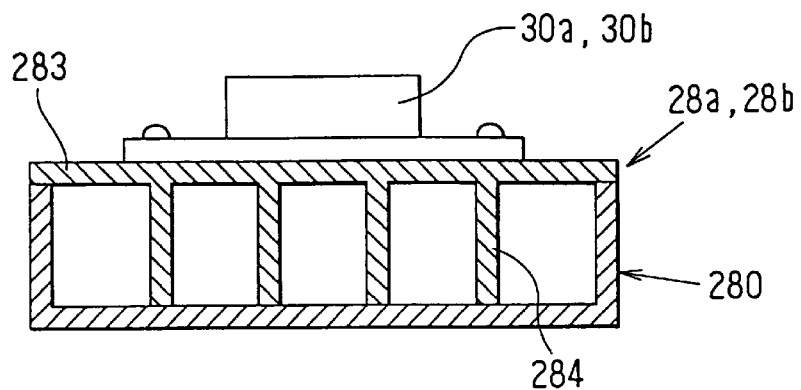
FIG. 2(a) is a apartially sectional front elevation of a heating part cooling heat exchanger to be used in the first embodiment.
Figure 2B:
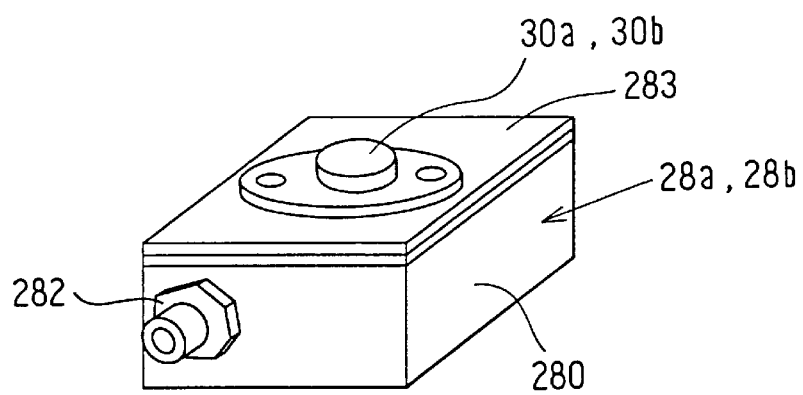
FIG. 2(b) is a perspective view of the same heat exchanger.
Figure 2C:
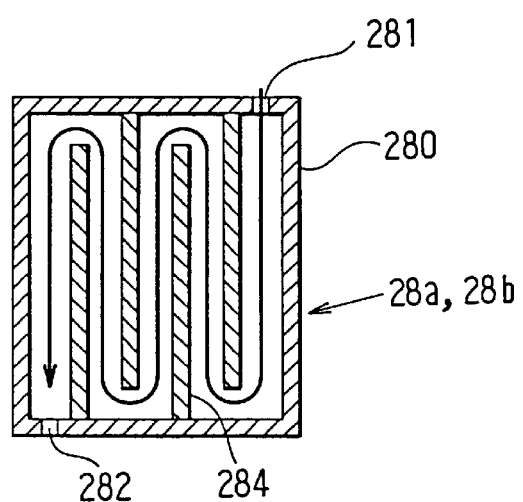
FIG. 2(c) is a transverse section of the same heat exchanger.

The heating parts 30a and 30b are exemplified by the semiconductor switching elements (or power transistors) of the rotational speed controlling inverter of the (not-shown) AC motor for running the electric car or the batteries mounted on the vehicle. FIGS. 2(a) through 2(c) show one example of the specific structure of the heat exchanger 28a or 28b.

As shown in FIGS. 2(a) through 2(c), the heat exchanger 28a or 28b has a box-shaped body case 280 forming the refrigerant passage, and this body case 280 is provided at its diagonal positions with a refrigerant inlet 281 and a refrigerant outlet 282. The refrigerant, as pressure-reduced and expanded by the pressure regulator 27a or 27b, flows into the refrigerant inlet 281, and the refrigerant, as has flown out of the refrigerant outlet 282, flows into the evaporation pressure regulating valve 29a or 29b.

An upper cover 283 of the body case 280 is made of a metal having an excellent thermal conductivity such as aluminum and is molded integrally with fins 284 for promoting the heat transfer. These fins 284 also work as partitions for partitioning the refrigerant passage in the body case 280 in a meandering shape, as shown in FIG. 2(c). The body case 280 is also made of a metal such as aluminum so that the body case 280 and the upper cover 283 are bonded gas-tight by bonding means such as soldering means.

On the other hand, the heating part 30a or 30b is fixed on the upper cover 283 by fastening means such as screws. As a result, the heat of the heating part 30a or 30b can be satisfactorily transferred from the upper cover 283 through the fins 284 into the refrigerant flowing meandering in the inside of the body case 280.

The pressure regulator 27a or 27b is exemplified in the embodiment of FIG. 1 by a temperature actuated type expansion valve for regulating the degree of superheat of the refrigerant in the outlet side passage of the heat exchanger 28a or 28b to a predetermined level and has a temperature sensing cylinder 27a' or 27b'. On the other hand, the evaporation pressure regulating valve 29a or 29b regulates the refrigerant evaporation pressure of the heat exchanger 28a or 28b so that the refrigerant evaporation temperature may take a predetermined level matching the kind (or the level of the heating temperature) of the heating part 30a or 30b, and is well known in the prior art to regulate the opening of the refrigerant passage by its valve member responding to the evaporation pressure.

The aforementioned refrigerant compressor 20 is an electric compressor, in which a not-shown AC motor is integrally packaged in a sealed case, so that it is driven by the motor to inhale, compress and discharge the refrigerant. Moreover, the refrigerant compressor 20 is provided with: a discharge port 20a for discharging the compressed refrigerant; an intake port 20b for inhaling the refrigerant at the lower pressure side of the cycle; and a gas injection port 20c for injecting the gas refrigerant under an intermediate pressure into midway of the compression stroke. This gas injection port 20c communicates with the downstream sides of the evaporation pressure regulating valves 29a and 29b by way of a gas injection passage 20d having the check valve 26c.

On the other hand, the AC motor of the refrigerant compressor 20 is supplied with an AC voltage by an inverter 40 so that its rotational speed can be continuously changed by adjusting the frequency of the AC voltage by the inverter 40. This inverter 40 is supplied with a DC voltage from the battery 41 mounted on the vehicle.

Moreover, the power to the inverter 40 is controlled by an air conditioning control unit 42, which is an electronic control unit composed of a microcomputer and its peripheral circuits so that it controls the switching of the four-way valve 21 and the RPM of the blower 3.

To the air conditioning control unit 42, there are sensor signals from an air conditioning sensor group 43 which includes an ambient temperature sensor for detecting the ambient temperature, an evaporator temperature-sensor for detecting the air temperature just after blown from the cooling evaporator 11, and a discharge pressure sensor for detecting the refrigerant pressure (or a higher pressure of the cycle), as discharged from the compressor 20. To the control unit 42, there are further inputted air conditioning operation signals from a group 44 of individual levers and switches of the air conditioning control panel, as disposed in the vicinity of the driver's seat in the compartment.

The operations of the aforementioned construction will be described in the following. If a heating mode is set by the air conditioning operation signals from the air conditioning control panel, the compressor 20 is driven by the control unit 42, and the refrigerant is allowed to flow in the passage, as indicated by solid arrows in the refrigerating cycle of FIG. 1, by the four-way valve 21.

Specifically, the gas refrigerant, as discharged from the compressor 20, flows through the four-way valve 21 into the indoor heat exchanger 22, in which it is condensed and liquefied by exchanging (or releasing) the heat with the air blown by the blower 3. The hot air, as heated by the heat released from the gas refrigerant, is blown mainly from the foot outlet 8 into the compartment to heat the inside of the compartment.

The liquid refrigerant, having flown out of the indoor heat exchanger 22, is pressure-reduced and expanded into a vapor-liquid two-phase state by the pressure regulator 25 until it flows into the outdoor heat exchanger 23. In this outdoor heat exchanger 23, the liquid refrigerant extracts the heat of the blown air (or outside air) of the outdoor fan 23a so that it evaporates into a gas refrigerant. This gas refrigerant is inhaled by the intake port 20b of the compressor 20 through the four-way valve 21 and the accumulator 24.

On the other hand, the remainder of the liquid refrigerant having flown out of the indoor heat exchanger 22 is pressure-reduced through the check valve 26a into a vapor-liquid two-phase state by the pressure regulators 27a and 27b until it is distributed between the two heat exchangers 28a and 28b. This vapor-liquid two-phase refrigerant under the intermediate pressure extracts the heat from the individual heating parts 30a and 30b in the heat exchangers 28a and 28b so that it evaporates and cools the individual heating parts 30a and 30b.

The gas refrigerant having evaporated in the heat exchangers 28a and 28b passes the evaporation pressure regulating valves 29a and 29b and then the gas injection passage 20d having the check valve 26c until it is inhaled from the gas injection port 20c into the compressor 20.

Here, the refrigerant flow rate to the heat exchangers 28a and 28b is so regulated that the refrigerant at the exits of the heat exchangers 28a and 28b may take a predetermined degree of superheat at the pressure regulators 27a and 27b made of the temperature actuated type expansion valves. As a result, only the gas refrigerant can be inhaled (or injected) from the gas injection port 20c in the course of the compression process of the compressor 20. By the evaporation pressure regulating valves 29a and 29b, moreover, the refrigerant evaporation temperatures of the heat exchangers 28a and 28b can be set independently of each other to predetermined levels matching the kinds (or the levels of the heating temperature) of the individual heating parts 30a and 30b.

As a result, it is possible to prevent in advance the trouble that the heating parts 30a and 30b are excessively cooled and bedewed on their surfaces to induce their failures.

In the first embodiment, the aforementioned operations are performed at the heating time so that the individual heating parts 30a and 30b can be cooled directly with the liquid refrigerant in the heat exchangers 28a and 28b. As a result, the construction can be far more simplified than that of the cooling system of the prior art having a cooling water circulating circuit. At the same time, the heating capacity can be effectively improved.

Figure 3A:
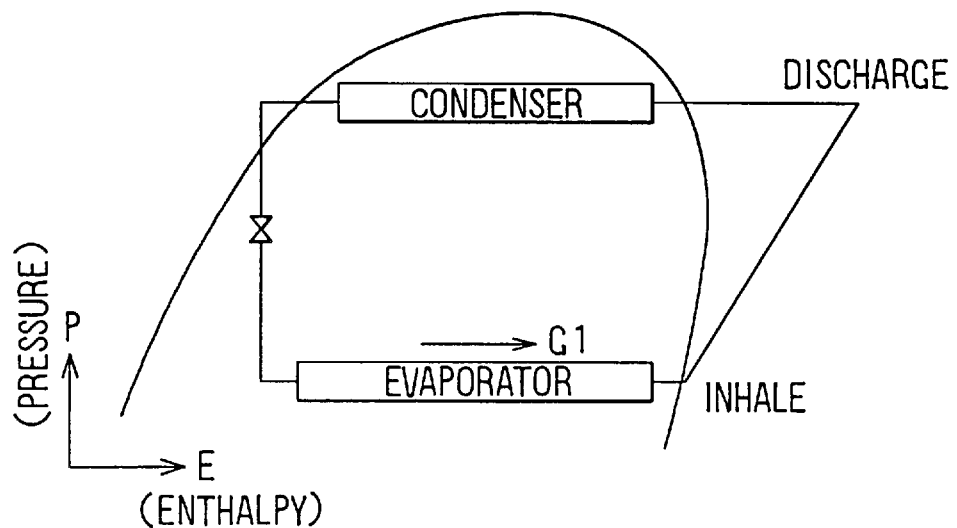
FIG. 3(a) is a Mollier diagram illustrating the operations of a system of the prior art.
Figure 3B:
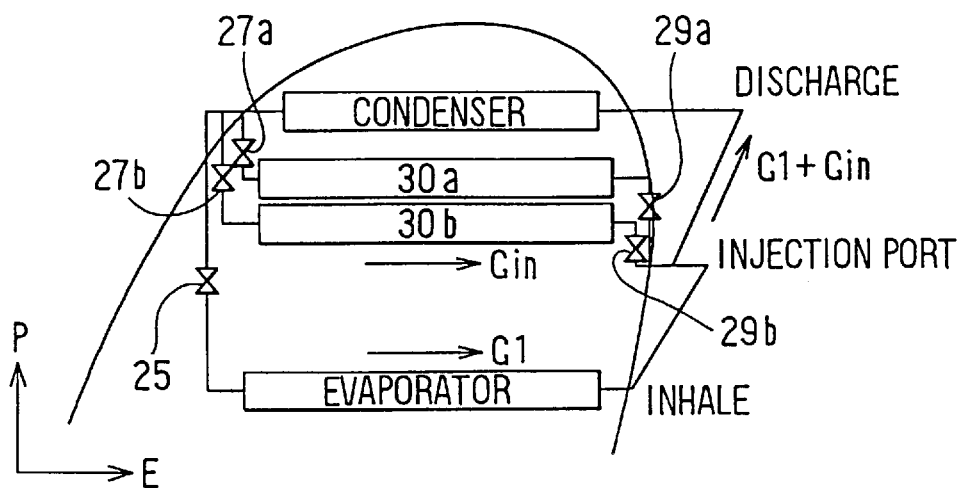
FIG. 3(b) is a Mollier diagram illustrating the operations of the first embodiment.

The improving effect of this heating capacity will be described in detail with reference to FIGS. 3(a) and 3(b). FIG. 3(a) is a Mollier diagram of the ordinary refrigerating cycle of the prior art, and FIG. 3(b) is a Mollier diagram of the refrigerating cycle of the construction in which the heat exchangers 28a and 28b according to the present invention are disposed upstream of the gas injection passage 20d communicating with the gas injection port 20c.

In the type of the ordinary refrigerating cycle of the prior art, in which the heat is extracted from the outside air by the outdoor heat exchanger (or evaporator) only, as the ambient temperature lowers at the heating time, the suction pressure drops to increase the capacity to the refrigerant so that the circulation of the refrigerant to be inhaled by the compressor 20 decreases to lower the heating capacity. Moreover, the reduction in the suction pressure increases the compression ratio to invite an increase in the compression power.

In the present embodiment, on the contrary, the flow rate Gin of the refrigerant, as injected, is added to the flow rate G1 of the refrigerant sucked by the compressor 20 so that the refrigerant flow rate to the indoor heat exchanger (or condenser) 22 increases. In the heat exchangers 28a and 28b, the waste heats of the individual heating parts 30a and 30b are recovered (or extracted) into the liquid refrigerant under the intermediate pressure so that the refrigerant under the intermediate pressure is evaporated and injected into the compressor 20. As a result, the radiation of heat of the refrigerant in the indoor heat exchanger (or condenser) 22 can be increased to raise the heating capacity.

Moreover, the refrigerant under the intermediate pressure is evaporated by the waste heats of the individual heating parts 30a and 30b and injected into the compressor 20. The refrigerant to be injected may be compressed from the intermediate to discharge pressures by the compressor 20 so that it need not be compressed from the suction to discharge pressure, unlike the ordinary cycle of the prior art. By the heat extraction from the individual heating parts 30a and 30b, moreover, the amount of the gas refrigerant to be injected can be further increased.

Therefore, the average suction pressure in the compressor 20 can be raised to lower the compression ratio so that the compression power can be suppressed to increase a resulting performance coefficient. As a result, not only the heating capacity but also the cycle efficiency can be improved to suppress the power consumption.

This suppression of the power consumption in this compressor 20 can contribute to an extension of mileage of the electric car per one charge to provide high practical effects.

Next, when the cooling mode is set by the air conditioning operation signals from the air conditioning control panel, the refrigerant is allowed to flow in the broken arrows by the four-way valve 21 in the refrigerating cycle of FIG. 1.

Specifically, the superheated gas refrigerant, as, discharged from the compressor 20, at a high temperature and under a high pressure flows through the four-way vale 21 into the outdoor heat exchanger 23, in which it exchanges the heat with the outside air blown by the outdoor fan 23a so that the gas refrigerant is condensed into a liquid. This liquid refrigerant is partially pressure-reduced and expanded in the pressure regulator 25 and then flows into the indoor heat exchanger 22. In this indoor heat exchanger 22, the refrigerant extracts the heat from the blown air of the blower 3 and evaporates. The cool air, thus cooled by the heat extraction, is usually blown from the face outlet 7 into the compartment to cool the inside of the same. The gas refrigerant having flown out of the indoor heat exchanger 22 is sucked through the four-way valve 21 and the accumulator 24 by the compressor 20.

On the other hand, the remainder of the liquid refrigerant, as liquefied in the outdoor heat exchanger 23, lows through the check valve 26b and is pressure-regulated to the intermediate pressure by the pressure regulators 27a and 27b so that it comes into the vapor-liquid two-phase state, until it is distributed between the two heat exchangers 28a and 28b. In these heat exchangers 28a and 28b, the vapor-liquid two-phase refrigerant under the intermediate pressure extracts the heat from the individual heating parts 30a and 30b to evaporate and cool the individual heating parts 30a and 30b.

At the cooling time, therefore, the heating parts 30aand 30b can also be cooled so that they can always be cooled with the refrigerant only thereby to disuse the cooling water circulating system for cooling the heating parts 30a and 30b.

Second Embodiment

Figure 4A:
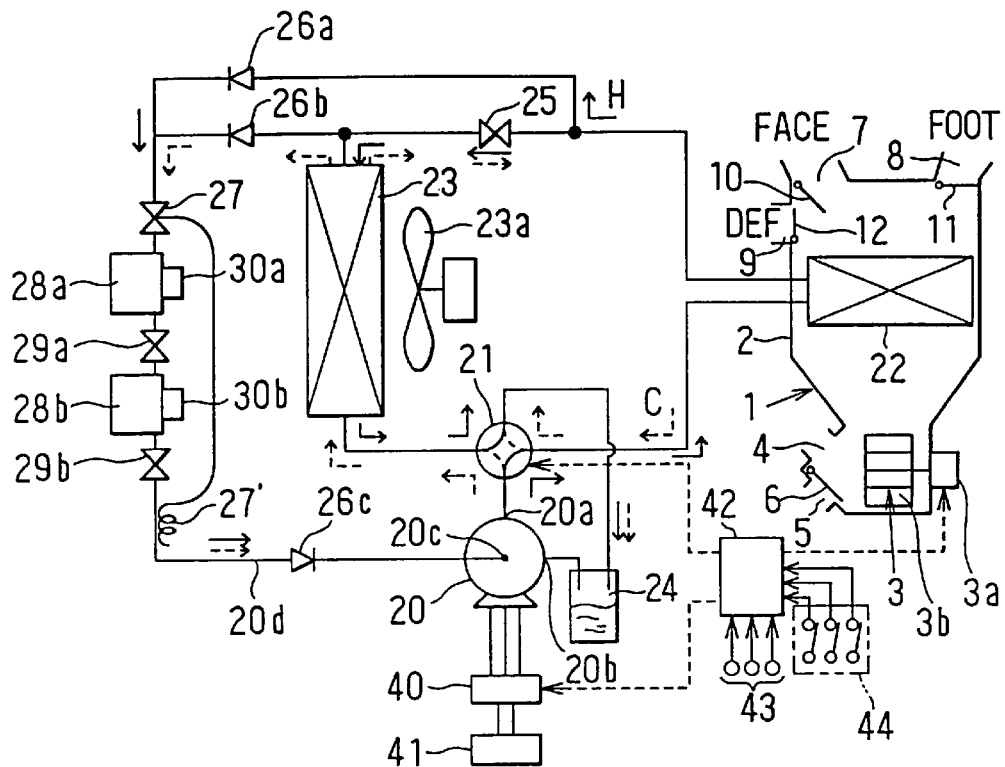
FIG. 4(a) is a refrigerating cycle diagram showing a second embodiment of the present invention.
Figure 4B:
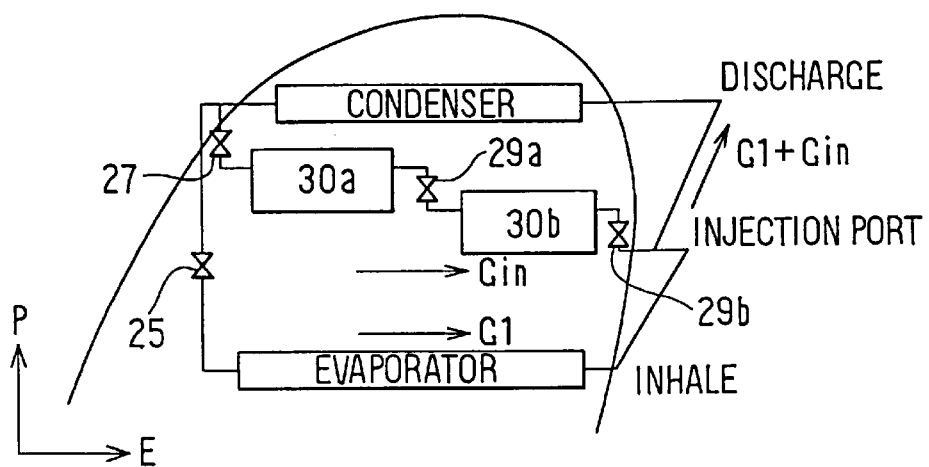
FIG. 4(b) is a Mollier diagram showing the operations of the second embodiment.

FIGS. 4(a) and 4(b) show a second embodiment, in which the two heat exchangers 28a and 28b are arranged in series with the refrigerant passage, although they are arranged in parallel with the refrigerant passage in the first embodiment. As a result, only one pressure regulator (or temperature actuated expansion valve) 27 is disposed at the entrance of the series circuit so that the flow rate of refrigerant at the exit of the downstream heat exchanger 28b may be regulated to have a predetermined degree of superheat.

On the other hand, the vapor pressure regulator valves 29a and 29b are disposed downstream of the two heat exchangers 28a and 28b, respectively, to set the refrigerant evaporation temperatures of the heat exchangers 28a and 28b independently. In the present embodiment, however, the higher one 28a of the two heat exchangers 28a and 28b necessarily has a higher refrigerant evaporation temperature higher than that of the downstream heat exchanger 28b. Thus, the heating part 30a, as required to have a higher cooling temperature, is cooled by the upstream of the heat exchanger 28a, and the heating part 30b, as required to have a lower-cooling temperature, is cooled by the downstream heat exchanger 28b. Reference numeral 27' designates a temperature sensing cylinder of the pressure regulator (or temperature actuated expansion valve) 27. The remaining construction is identical to that of the first embodiment.

In either of the first and second embodiments, the evaporation pressure regulating valves 29a and 29b may be replaced by variable throttle devices (or flow rate control valves) capable of adjusting the opening (or throttling) of the refrigerant passage from the outside so that the refrigerant evaporation temperatures (or cooling temperatures) of the heat exchangers 28a and 28b may be regulated according to the heating temperatures (or calories) of the heating parts 30a and 30b.

Third Embodiment

Figure 5A:
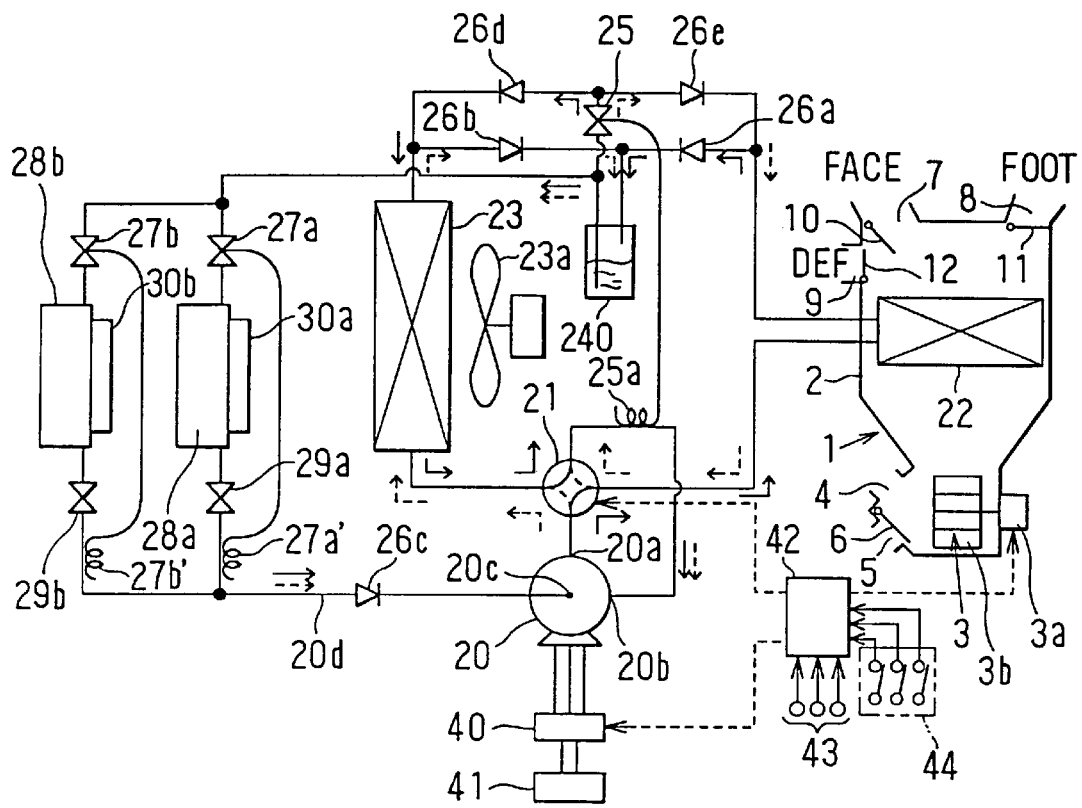
FIG. 5(a) is a refrigerating cycle diagram showing a third embodiment of the present invention.
Figure 5B:
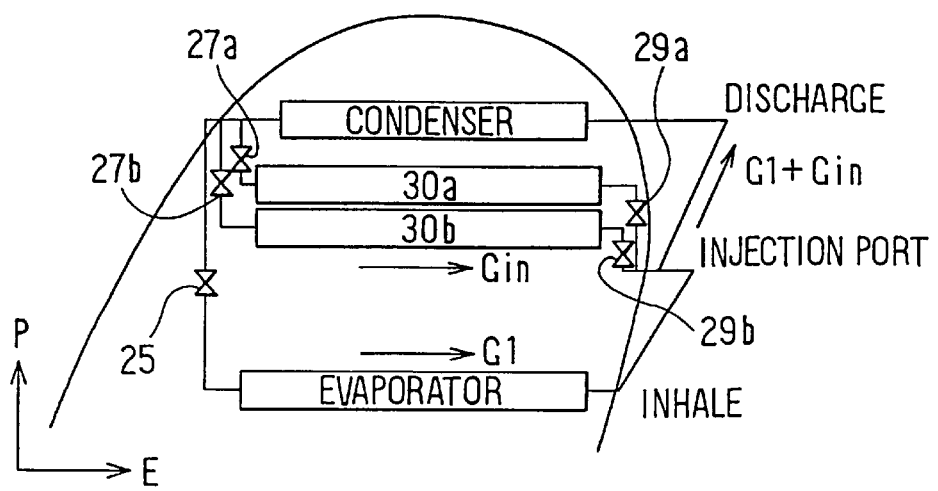
FIG. 5(b) is a Mollier diagram showing the operations of the third embodiment.

FIGS. 5(a) and 5(b) show a third embodiment, in which the accumulator of the first and second embodiments, as positioned at the suction side of the compressor 20, is eliminated and replaced by a receiver (or vapor-liquid separator) 240 disposed at the higher pressure side of the cycle to separate the vapor and liquid of the refrigerant and to reserve the liquid refrigerant, so the so-called "receiver cycle" is made.

In the passage through which the liquid refrigerant flows from the receiver 240, there is disposed the pressure regulator 25 which is made of a temperature actuated type expansion valve. The pressure regulator (or temperature actuated type expansion valve) 25 has a temperature sensing cylinder 25a in the suction piping of the compressor 20 to adjust the flow rate of refrigerant so that the refrigerant inhaled by the compressor 20 may take a predetermined degree of superheat.

Moreover, the passage at the exit side of the pressure regulator 25 is branched by check valves 26d and 26e into two branches, one of which is connected to the indoor heat exchanger 22 and the other of which is connected to the outdoor heat exchanger 23.

Here will be described the operations of the third embodiment. When the heating mode is set, the refrigerant is allowed to flow, as indicated by solid arrows, by the four-way valve 21 in the refrigerating cycle of FIG. 5(a).

Specifically, the gas refrigerant, as discharged from the compressor 20, flows through the four-way valve 21 into the indoor heat exchanger 22, in which it exchanges (or releases) the heat with the blown air of the blower 3 so that it is condensed and liquefied. The hot air, as heated by the heat release of the refrigerant, is blown mainly from the foot outlet 8 into the compartment to heat the inside of the same.

Here, the refrigerant having flown out of the indoor heat exchanger 22 flows through the check valve 26a into the receiver 240. Here, the refrigerant is separated into vapor and liquid, and the liquid refrigerant having flown out of the receiver 240 is partially pressure-regulated and expanded into the vapor-liquid two-phase state by the pressure regulator 25. This pressure-regulated refrigerant flows through the check valve 26d into the outdoor heat exchanger 23. In this outdoor heat exchanger 23, the refrigerant extracts the heat from the outside so that it evaporates.

The gas refrigerant having evaporated in the outdoor heat exchanger 23 is sucked through the four-way valve 21 by the intake port 20b of the compressor 20.

On the other hand, the remainder of the liquid refrigerant having flown out of the receiver 240 is pressure-regulated to an intermediate pressure into the vapor-liquid two-phase state by the pressure regulators 27a and 27b until it is distributed between the two heat exchangers 28a and 28b. This vapor-liquid two-phase refrigerant under the intermediate pressure extracts the heat from the individual heating parts 30a and 30b in the heat exchangers 28a and 28b so that it evaporates and cools the heating parts 30a and 30b.

The gas refrigerant having evaporated in the heat exchangers 28a and 28b flows through the evaporation pressure regulating valves 29a and 29b and then the gas injection passage 20d having the check valve 26c until it is sucked from the gas injection port 20c into the compressor 20.

In the third embodiment, too, the flow rate of refrigerant is so regulated by the pressure regulators 27a and 27b of the temperature actuated type expansion valves that the refrigerant at the exits of the heat exchangers 28a and 28b may take a predetermined degree of superheat. As a result, only the gas refrigerant can be sucked (or injected) into the gas injection port 20c. Moreover, the refrigerant evaporation temperatures of the heat exchangers 28a and 28b can be independently set by the evaporation pressure regulating valves 29a and 29b to predetermined temperatures matching the kinds (or the levels of the heating temperature) of the individual heating parts 30a and 30b.

When the cooling mode is set, the refrigerant is allowed to flow along broken arrows by the four-way valve 21 in the refrigerating cycle of FIG. 5 (a).

Specifically, the gas refrigerant, as discharged from the compressor 20, flows through the four-way valve 21 into the outdoor heat exchanger 23, in which it exchanges the heat with the outside air so that it condenses and liquefies. This liquid refrigerant flows through the check valve 26b into the receiver 240. The liquid refrigerant having flown out of the receiver 240 is partially press-regulated and expanded into the vapor-liquid two-phase state by the pressure regulator 25. This pressure-reduced refrigerant flows through the check valve 26e into the indoor heat exchanger 22.

In this indoor heat exchanger 22, the refrigerant extracts the heat from the blown air of the blower 3 so that it evaporates. The cool air thus cooled by the heat extraction is usually blown from the face outlet 7 into the compartment to cool the inside of the same. The gas refrigerant having evaporated in the indoor heat exchanger 22 is sucked through the four-way valve 21 by the intake port 20b of the compressor 20.

On the other hand, the remainder of the liquid refrigerant having flown out of the receiver 240 is pressure-regulated to the intermediate pressure into the vapor-liquid two-phase state by the pressure regulators 27a and 27b until it is distributed between the two heat exchangers 28a and 28b. In these heat exchangers 28a and 28b, the vapor-liquid two-phase refrigerant under the intermediate pressure extracts the heat from the individual heating parts 30a and 30b so that it evaporates and cools the heating parts 30a and 30b. At the cooling time, too, the heating parts 30a and 30b can be cooled so that the heating parts 30a and 30b can always be cooled with the refrigerant only.

Fourth Embodiment

FIG. 6 shows a fourth embodiment in which the receiver cycle according to the third embodiment is modified. At the refrigerant inlet portion of the receiver 240, there is disposed a pressure regulator 31 for regulating the refrigerant to an intermediate pressure. This refrigerant under the intermediate pressure is separated into vapor and liquid in the receiver 240. The gas refrigerant thus produced is sucked through the check valve 26c into the gas injection port 20c by the gas injection passage 20e having a pressure regulator 32.

The liquid refrigerant having been subjected to the vapor-liquid separation in the receiver 240 is partially pressure-regulated by the pressure regulator 25 so that it is allowed at the heating time to flow into the outdoor heat exchanger 23 by the check valve 26d and at the cooling time to flow into the indoor heat exchanger 22 by the check valve 26e. The remainder of the liquid refrigerant flows through a pressure regulator 27 into a heat exchanger 28 to cool a heating part 30.

The pressure regulator 32 of the gas injection passage 203 is made of suitable throttle means to throttle the gas refrigerant passage from the receiver 240 thereby to take a pressure balance between the two gas injection passages 20d and 20e connected in parallel.

Figure 6A:
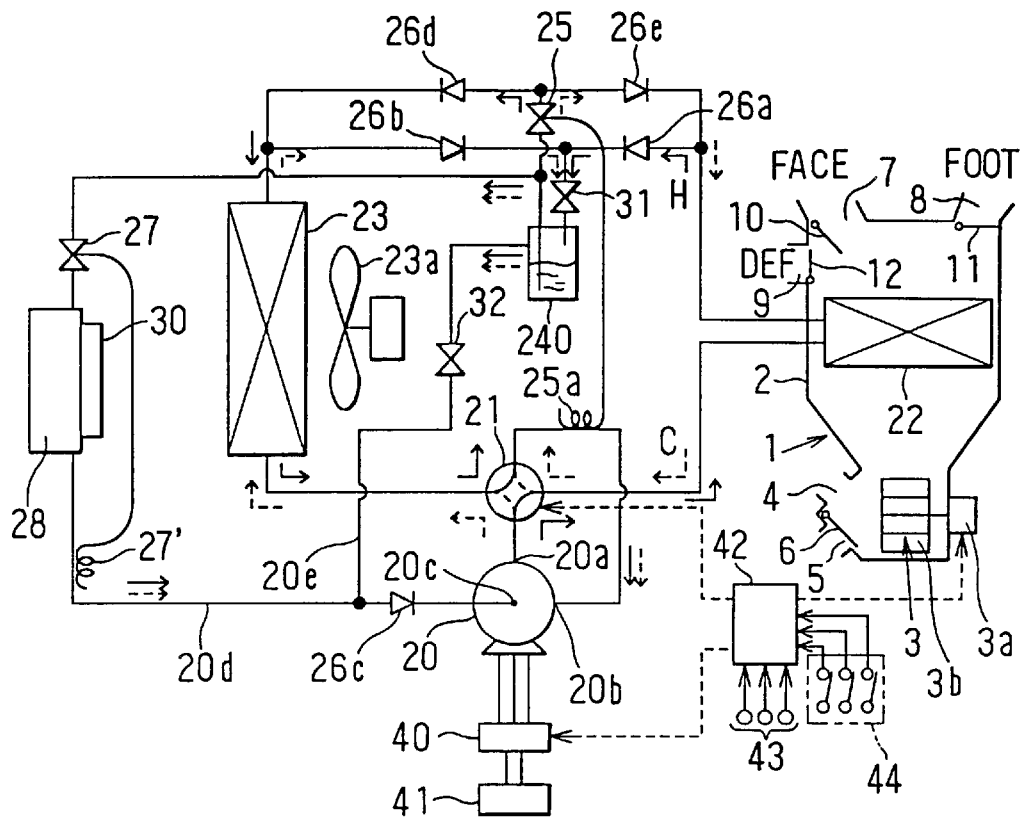
FIG. 6(a) is a refrigerating cycle diagram showing a fourth embodiment of the present invention.
Figure 6B:
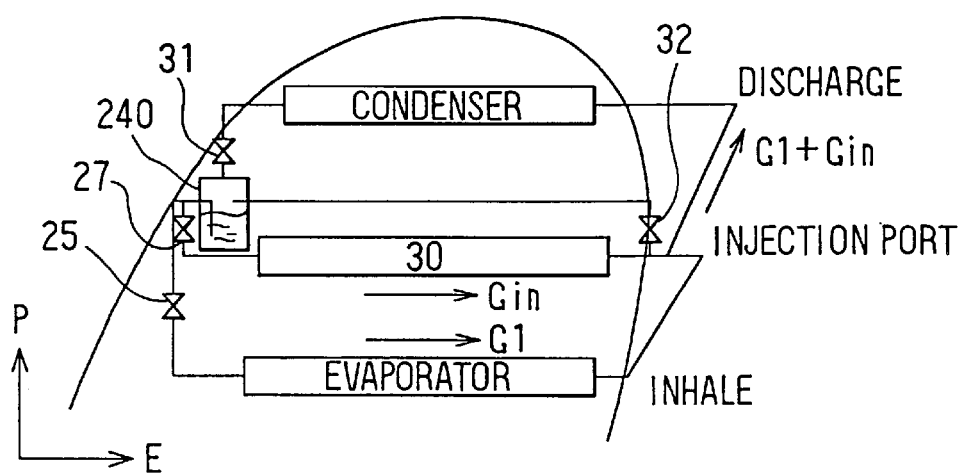
FIG. 6(b) is a Mollier diagram showing the operations of the fourth embodiment.

According to the fourth embodiment, even by injecting the gas refrigerant of the receiver 240 directly, the difference in enthalpy between the refrigerants to flow through the heating part cooling heat exchanger 28 and through the indoor heat exchanger 22 can be enlarged (as illustrated in FIG. 6(b)) to improve the cycle efficiency better.

Fifth Embodiment

Figure 7A:
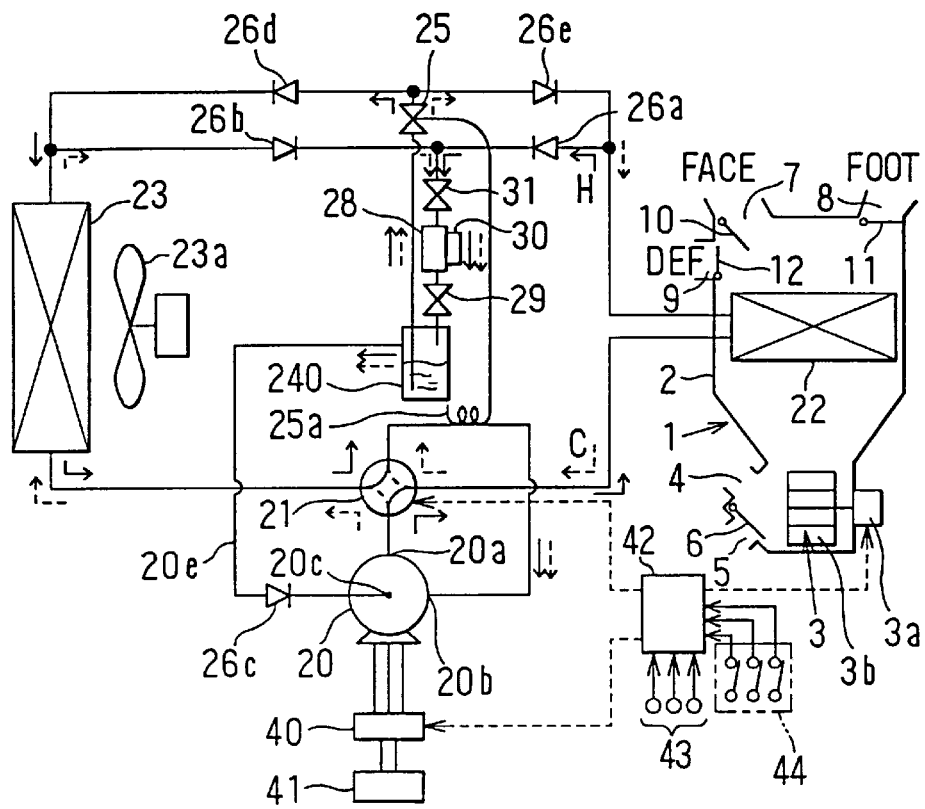
FIG. 7(a) is a refrigerating cycle diagram showing a fifth embodiment of the present invention.
Figure 7B:
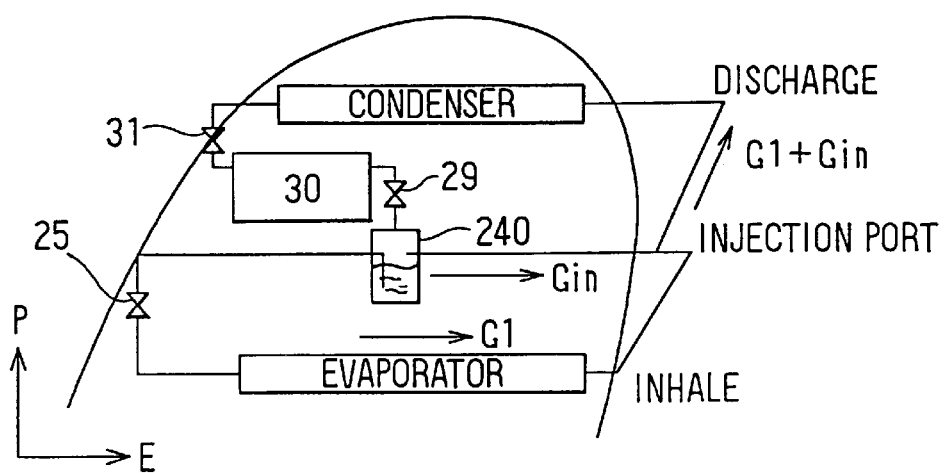
FIG. 7(b) is a Mollier diagram showing the operations of the fifth embodiment.

FIGS. 7(a) and 7(b) show a fifth embodiment, in which the heat exchanger 28 of the heating part 30 and an evaporation pressure regulating valve 29 are interposed in series between the exit side of the pressure regulator 31 and the refrigerant inlet of the receiver 240 in the receiver cycle of FIG. 6(a).

As a result, the heating part 30 can be cooled with the refrigerant which has been pressure-regulated to an intermediate pressure by the pressure regulator 31. After having cooled the heating part 30, the refrigerant flows through the evaporation pressure regulating valve 29 into the receiver 240, in which it is subjected to a vapor-liquid separation. The gas refrigerant is sucked into the gas injection port 20c by the gas injection passage 20e having the check valve 26c.

The evaporation pressure regulating valve 29, as located downstream of the heat exchanger 28 of the heating part 30, regulates the refrigerant pressure in the heat exchanger 28 to regulate the refrigerant evaporation temperature in the heat exchanger 28.

Sixth Embodiment

Figure 8:
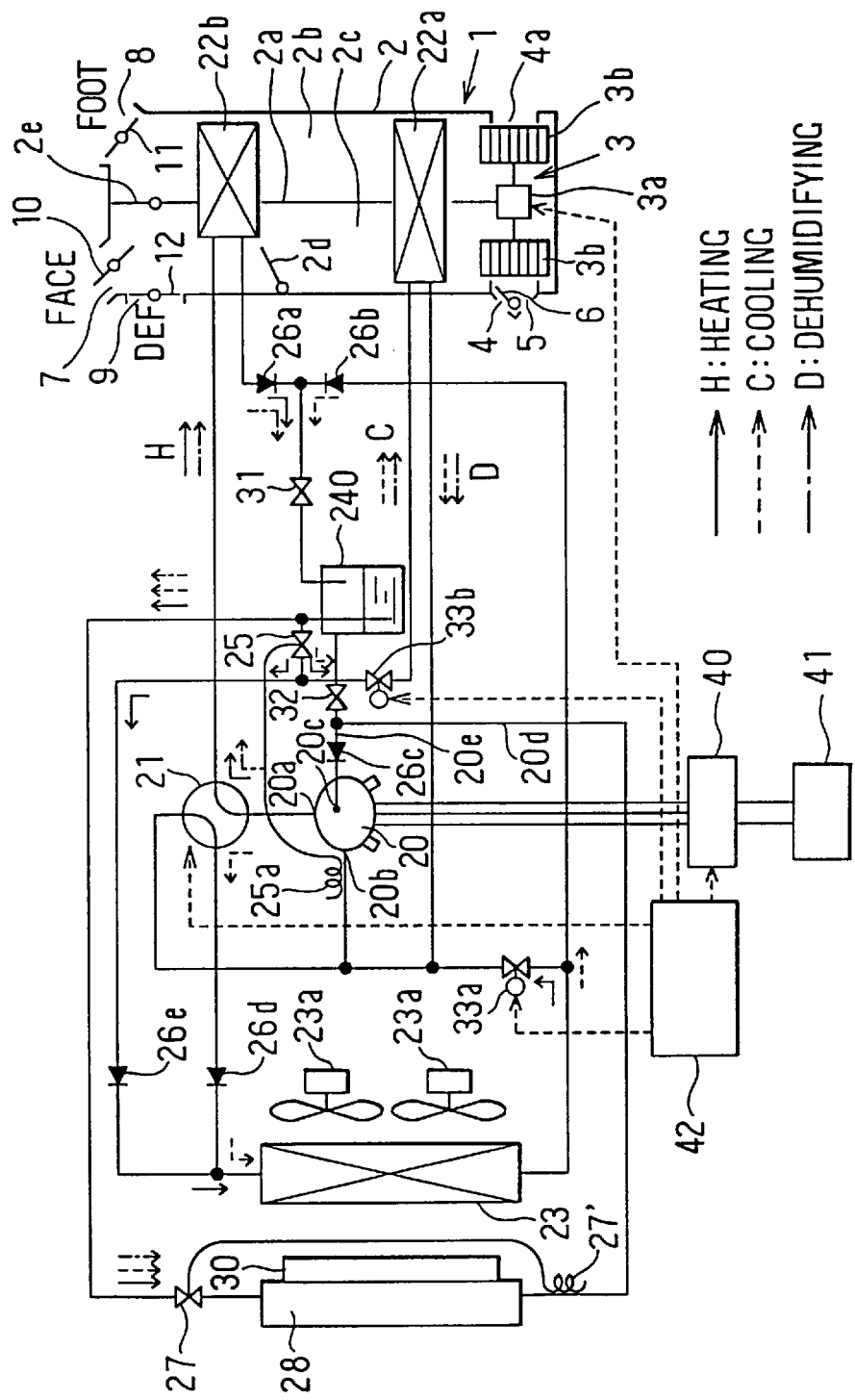
FIG. 8 is a refrigerating cycle diagram showing a sixth embodiment of the present invention.

FIG. 8 shows a sixth embodiment, in which the refrigerating cycle is made as a heat pump cycle for dehumidifying heating operations and in which the construction of the air conditioner unit 1 is modified.

Here will be stressed these modified portions. The air conditioner unit 1 is provided at one end side of the air conditioning duct 2 with the inside air intake port 4, the outside air intake port 5, the inside/outside air changing door 6 for opening/closing the intake ports 4 and 5, and an inside air intake port 4a opened at all times.

The blower 3 is equipped with the two centrifugal fans 3b and 3b to be driven by the motor 3a. In the air conditioning duct 2 downstream of the blower 3, there is disposed a cooling evaporator 22a. This cooling evaporator 22a is an indoor heat exchanger forming part of the refrigerating cycle and functions as a heat exchanger for dehumidifying and cooling the air in the air conditioning duct 2 in the cooling mode and in the dehumidifying mode by the heat extracting action of the refrigerant flowing therein.

In the air conditioning duct 2 downstream of the cooling evaporator 22a, on the other hand, there is disposed a heating condenser 22b. This heating condenser 22b is an indoor heat exchanger forming part of the refrigerating cycle 21 and functions as a heater for heating the air in the air conditioning duct 2 in the heating mode and in the dehumidifying mode by the heat releasing action of the refrigerant flowing therein.

On the other hand, the air passage in the air conditioning duct 2 is separated by a partition 2a into a first air passage 2b at the side of the foot outlet 8 and a second air passage 2c at the side of the face outlet 9 and the defroster outlet 10. This halving of the air passages 2b and 2c is carried out so as: to lighten the heating load by introducing in winter the inside air at a higher temperature into the air passage 2b at the side of the foot outlet 8 from the inside inlet 4a thereby to blow the hot air to the feet; and to prevent the windshield from frosting without fail by introducing the outside air having a low humidity into the air passage 2c at the side of the defroster outlet 10.

A door 2d is provided for opening/closing the second air passage 2c, and a door 2e is provided for opening/closing the partition between the first and second air passages 2b and 2c.

On the other hand, the refrigerating cycle is made as a heat pump type refrigerating cycle for cooling, heating and dehumidifying the inside of the compartment with the cooling evaporator 22a and the heating evaporator 22b. Thus, the construction of the refrigerating cycle is different in the following points from those of the foregoing first to fifth embodiments.

Specifically, the outlets of the check valves 26d and 26e are made confluent and connected to the refrigerant inlet side of the outdoor heat exchanger 23, and there are additionally provided solenoid valves 33a and 33b for switching the running modes of the heat pump. The remaining points of the refrigerating cycle are identical to those of the fourth embodiment shown in FIG. 6. Thus, the fundamental operations of the refrigerating cycle can be illustrated by a Mollier diagram of FIG. 6(b).

Here will be schematically described the operations of the individual running modes of the present embodiment. In the cooling mode, the four-way valve 21 and the solenoid valves 33a and 33b are set in the state of the cooling mode of FIG. 9 by the control unit 42 so that the refrigerant flows along broken arrows in the cooling cycle of FIG. 8.

Specifically, the superheated gas refrigerant, as discharged from the compressor 20, at a high temperature and under a high pressure flows through the check valve 26d into the outdoor heat exchanger 23, in which it exchanges the heat with the outside air so that it condenses. Next, the refrigerant having flown out of the outdoor heat exchanger 23 is pressure-regulated through the check valve 26b by the pressure regulator (or fixed throttle) 31, because the solenoid valve 33a is closed, until it takes the vapor-liquid two-phase state under the intermediate pressure.

This vapor-liquid two-phase refrigerant under the intermediate pressure flows into the receiver 240, in which it is separated into a saturated gas refrigerant and a saturated liquid refrigerant. The gas refrigerant flows from the gas refrigerant exit over the receiver 240 into the pressure regulator (or fixed throttle) 32, in which it is pressure-regulated again, and is sucked by the gas injection port 20c by way of the gas injection passage 20e having the check valve 26c.

On the other hand, the liquid refrigerant in the receiver 240 partially flows out of the liquid refrigerant exit, which is opened in the vicinity of the bottom portion of the receiver 240, and is pressure-regulated by the pressure regulator (or the temperature actuated type expansion valve) 25 until it flows through the solenoid valve 33b into the evaporator 22a. In this evaporator 22a, the refrigerant extracts the heat from the blown air of the blower 3 and evaporates. The cool air, as cooled by the evaporator 22a, is usually blown from the face outlet 7 into the compartment to cool the inside of the same.

The gas refrigerant having evaporated in the evaporator 22a is sucked into the intake port 20b of the compressor 20.

At this time, the temperature of the refrigerant, as sucked in the compressor, is detected by the temperature sensing cylinder 25a, which is disposed at the refrigerant intake passage of the compressor 20, is sensed and transmitted to the pressure regulator (or the temperature actuated type expansion valve) 25. As a result, the pressure regulator 25 adjusts the flow rate of the refrigerant to flow into the evaporator 22a so that the refrigerant to be sucked into the compressor may take a predetermined degree of superheat.

On the other hand, the remainder of the liquid refrigerant in the receiver 240 flows through the pressure regulator (or the temperature actuated type expansion valve) 27 into the heat exchanger 28 so that it extracts the heat from the heating part 30 and evaporates. As a result, the heating part 30 is cooled.

Next, in the heating mode, the four-way valve 21 and the solenoid valves 33a and 33b are set in the heating mode of FIG. 9 by the control unit 42 so that the refrigerant flows along solid arrows in the refrigerating cycle of FIG. 8.

Specifically, the gas refrigerant, as discharged from the compressor 20, flows through the four-way valve 21 into the condenser 22b at the compartment side, in which it exchanges (or releases) the heat with the blown air of the blower 3 and condenses. The hot air, as heated by the heat released from the gas refrigerant, is blown mainly from the foot outlet 8 into the compartment to heat the inside of the same.

Then, the refrigerant having flown out of the condenser 22b is pressure-regulated through the check valve 26a by the pressure regulator 31 so that it takes a vapor-liquid two-phase state under an intermediate pressure.

This vapor-liquid two-phase refrigerant under the intermediate pressure flows into the receiver 240, in which the separated gas refrigerant flows from the gas refrigerant exit over the receiver 240 through the pressure regulator 32. In this pressure regulator 32, the gas refrigerant is pressure-regulated again and is then sucked into the gas injection port 20c through the gas injection passage 20e having the check valve 26c.

On the other hand, the liquid refrigerant in the receiver 240 partially flows out of the liquid refrigerant exit and is pressure-regulated in the pressure regulator (or the temperature actuated type expansion valve) 25 until it flows through the check valve 263 into the outdoor heat exchanger 23. In this outdoor heat exchanger 23, the refrigerant extracts the heat from the outside air and evaporates. The gas refrigerant, as evaporated in the outdoor heat exchanger 23, is sucked through the solenoid valve 33a into the intake port 20b of the compressor 20.

On the other hand, the remainder of the liquid refrigerant in the receiver 240 flows through the pressure regulator (or the temperature actuated type expansion valve) 27 into the heat exchanger 28 so that it extracts the heat from the heating part 30 and evaporates. As a result, the heating part 30 is cooled.

Next, in the dehumidifying mode, the four-way valve 21 and the solenoid valves 33a and 33b are set in the state of the dehumidifying mode of FIG. 9 by the control unit 42 so that the refrigerant flows along single-dotted arrows in the refrigerating cycle of FIG. 8.

Specifically, the gas refrigerant, as discharged from the compressor 20, flows through the four-way valve 21 into the condenser 22b at the compartment side, in which it exchanges (or releases) the heat with the blown air of the blower 3 and evaporates. The refrigerant having flown out of the condenser 22b is pressure-regulated through the check valve 26a by the pressure regulator 31 so that it takes as vapor-liquid two-phase state under an intermediate pressure.

This vapor-liquid two-phase refrigerant under the intermediate pressure flows into the receiver 240, in which the separated gas refrigerant flows from the gas refrigerant exit over the receiver 240 through the pressure regulator 32. In this pressure regulator 32, the gas refrigerant is pressure-regulated again and is then sucked into the gas injection port 20c through the gas injection passage 20e having the check valve 26c.

On the other hand, the liquid refrigerant in the receiver 240 partially flows out of the liquid refrigerant exit of the receiver 240 and is pressure-regulated by the pressure regulator (or the temperature actuated type expansion valve) 25, until it flows through the open solenoid valve 33b into the evaporator 22a. At this time, the solenoid valve 33a is closed so that the refrigerant, as pressure-regulated by the pressure regulator (or the temperature actuated type expansion valve) 25, will not flow to the outdoor heat exchanger 23.

The refrigerant having flown into the evaporator 22a extracts the heat from the blown air of the blower 3 and evaporates until it is sucked into the compressor 20.

At the dehumidifying time, as described above, the refrigerant flows both the evaporator 22a and the condenser 22b, as disposed in the indoor air conditioner unit 1, so that the blown air of the blower 7 is cooled and dehumidified at first by the evaporator 22a and then heated again by the condenser 22b. Here, the amount of heat release of the refrigerant in the condenser 22b is the summation of the amount of heat extraction in the evaporator 22a and the power consumption of the compressor 20 so that the air temperature at the blown side of the condenser 22b is higher than the intake air temperatures of the inlets 4, 4a and 5. As a result, the heating operation can be performed simultaneously with the dehumidifying operation.

The improvements in the cooling and heating effects of the heating part 30 are identical to those of the first to fifth embodiments.

Seventh Embodiment

Figure 10A:
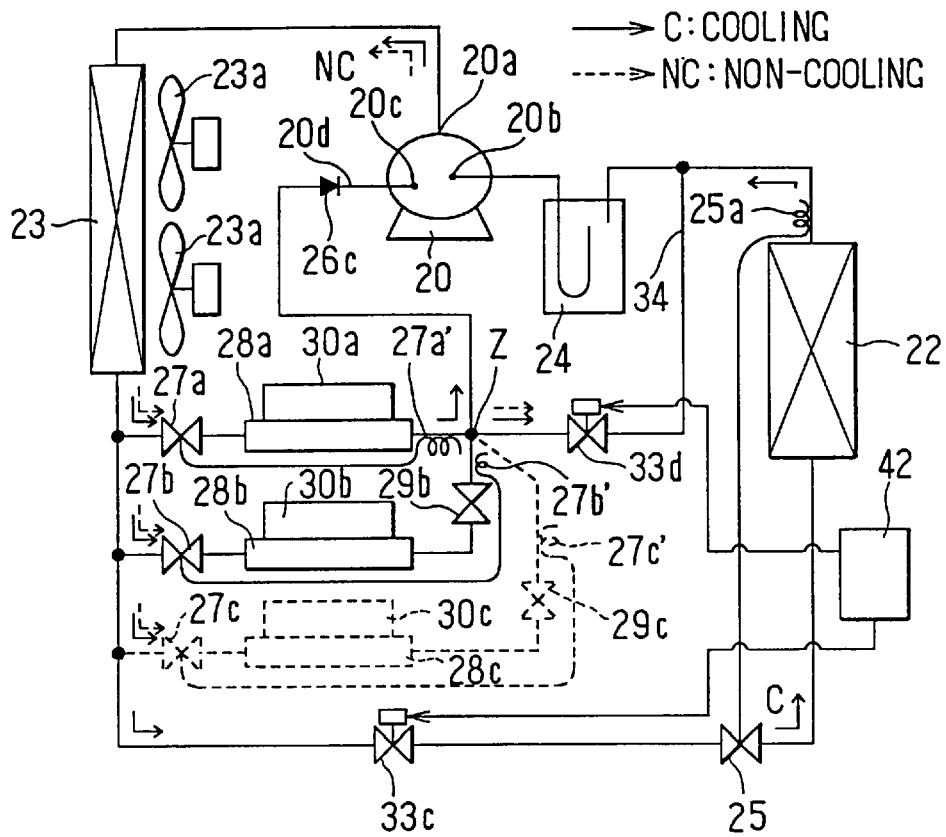
FIG. 10(a) is a refrigerating cycle diagram showing a seventh embodiment of the present invention.
Figure 10B:
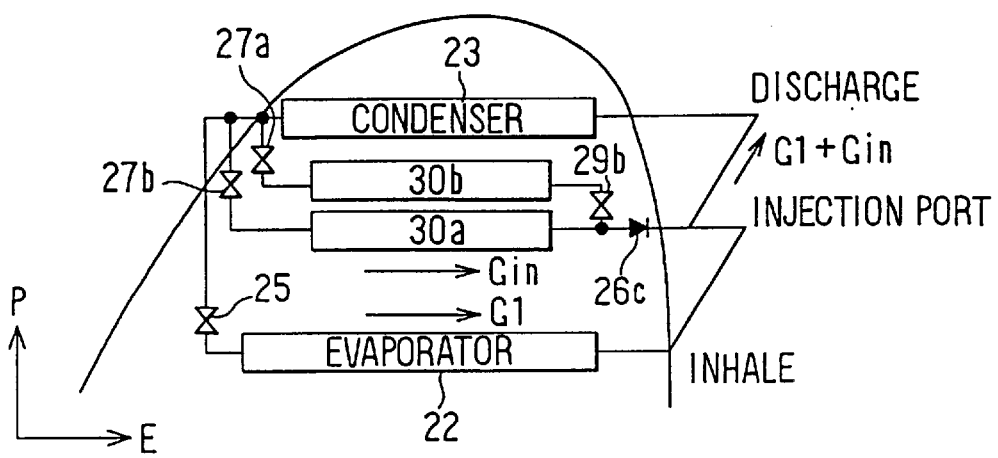
FIG. 10(b) is a Mollier diagram showing the operations of the seventh embodiment.

FIGS. 10(a) and 10(b) show a seventh embodiment, in which the present invention is applied to the refrigerating cycle not to be changed to the heating mode but especially for the cooling mode, although the heat pump cycle capable of changing the cooling and heating modes has been described in connection with the first to sixth embodiments.

In the seventh embodiment, to the downstream side of the condenser 23 or the outdoor heat exchanger, there are connected in parallel the heat exchangers 28a, 28b and 28c acting as coolers of the heating parts 30a, 30b and 30c through the pressure regulators (or the temperature actuated type expansion valves) 27a, 27b and 27c. At the downstream side of the heat exchangers 28b and 28c, there are disposed the evaporation pressure regulating valves 29b and 29c, the downstream sides of which are made confluent at point Z.

Moreover, this confluent point Z is connected to the gas injection passage 20d having the check valve 26c. The confluent point Z is further connected through a communication passage 34 to the refrigerant entrance of the accumulator 24. As a result, the gas injection passage 20d is parallel to the communication passage 34, which is equipped with a solenoid valve (or valve means) 33d for connecting/disconnecting the refrigerant flow.

On the other hand, the downstream side of the condenser 23 is connected in parallel with the refrigerant passages of the heat exchangers 28a, 28b and 28c and through a solenoid valve (or valve means) 33c and the pressure regulator (or the temperature actuated type expansion valve) 25 with the evaporator 22 or the indoor heat exchanger. This evaporator 22 is disposed in the air conditioning duct 2 of the air conditioner unit 1, as shown in FIG. 1 and the like, although not shown in FIG. 10(a), so as to cool the blown air of the blower 3 and accordingly the inside of the compartment. The refrigerant downstream side of the evaporator 2 is made confluent with the downstream side of the solenoid valve 33d and connected with the refrigerant entrance of the accumulator 24. The remaining construction of the refrigerating cycle is identical to that of the first embodiment shown in FIGS. 1 to 3.

Here will be described the operations of the seventh embodiment. When the cooling mode is set, the solenoid valve 33c is opened by the air conditioning control unit 42, but the solenoid valve 33d is closed. As a result, the refrigerant flows along solid arrows in the refrigerating cycle of FIG. 10(a).

Specifically, the superheated gas refrigerant, as discharged from the compressor 20, at a high temperature and under a high pressure flows into the condenser 23, in which it exchanges the heat with the outside air blown from the outdoor fan 23a so that it condenses and liquefies.

This liquid refrigerant is partially pressure-regulated through the open solenoid valve 33c to a low pressure by the pressure regulator 25 and then flows into the evaporator 22. In this evaporator 22, the refrigerant extracts the heat from the blown air in the air conditioning duct 2 (as shown in FIG. 1) so that it evaporates. The cool air thus cooled by this heat extraction is usually blown from the face outlet 7 (as shown in FIG. 1) into the compartment to cool the inside of the same.

Moreover, the gas refrigerant having flown out of the evaporator 22 is sucked through the accumulator 24 into the intake port 20b of the compressor 20.

On the other hand, the remainder of the liquid refrigerant, as liquefied by the condenser 23, is pressure-regulated to an intermediate pressure into a vapor-liquid two-phase state by the pressure regulators 27a, 27b and 27c until it is distributed between the heat exchangers 28a, 28b and 28c. This vapor-liquid two-phase refrigerant under the intermediate pressure extract the heat from the heating parts 30a, 30b and 30b, respectively, in the heat exchangers 28a, 28b and 28c so that it evaporates and cools the individual heating parts 30a, 30b and 30c.

The gas refrigerants having evaporated in the heat exchangers 28a, 28b and 28c pass through the evaporation pressure merge at the confluent point Z after having passed through the evaporation pressure regulating valves 29b and 29c. At this time, the solenoid valve 33d is opened, the gas refrigerant flows from the confluent point Z through the check valve 26c and is sucked through the gas injection passage 20d into the gas injection port 20c of the compressor 20.

FIG. 10(b) is a Mollier diagram illustrating the operations of the aforementioned refrigerating cycle, the detailed description will be omitted because it is basically identical to that of the first embodiment of FIG. 3(b).

Even when no cooling operation is required as in winter, the heating parts 30a, 30b and 30c can be cooled. Specifically, while the cooling mode is unused, the solenoid valve 33c is closed by the air conditioning control unit 42 whereas the solenoid valve 33d is opened. As a result, the refrigerant flows along broken arrows in the refrigerating cycle of FIG. 10.

Specifically, the superheated gas refrigerant, as discharged from the compressor 20, at a high temperature and under a high pressure flows into the condenser 23, in which it exchanges the heat with the outside air blown from the outdoor fan 23a so that it condenses and liquefies.

This liquid refrigerant is pressure-regulated into a vapor-liquid two-phase state wholly by the pressure regulators 27a, 27b and 27c, because the solenoid valve 33c is closed, until it is distributed among the heat exchangers 28a, 28b and 28c. In the heat exchangers 28a, 28b and 28c, as described above, this vapor-liquid two-phase refrigerant extracts the heat from the heating parts 30a, 30b and 30c and cools the same. The gas refrigerant having evaporated in the heat exchangers 28a, 28b and 28c flows through the evaporation pressure regulating valves 29b and 29c and then merge at the confluent point Z. Since the solenoid valve 33d is open at this time, the gas refrigerant flows from the confluence point Z through the communication passage 34 so that it is sucked through the accumulator 24 into the intake port 20b of the compressor 20. Thus, while the cooling mode is unused, the heating parts 30a, 30b and 30c can also be cooled without fail.

In the cooling dedicated cycle shown in FIG. 10(a), therefore, the heating parts 30a, 30b and 30c can always be cooled with the refrigerant only, to disuse the cooling water circulating system for cooling the heating parts 30a, 30b and 30c.

The remaining constructions, operations and effects are wholly identical to those of the first embodiment.

Eighth Embodiment

Figure 11:
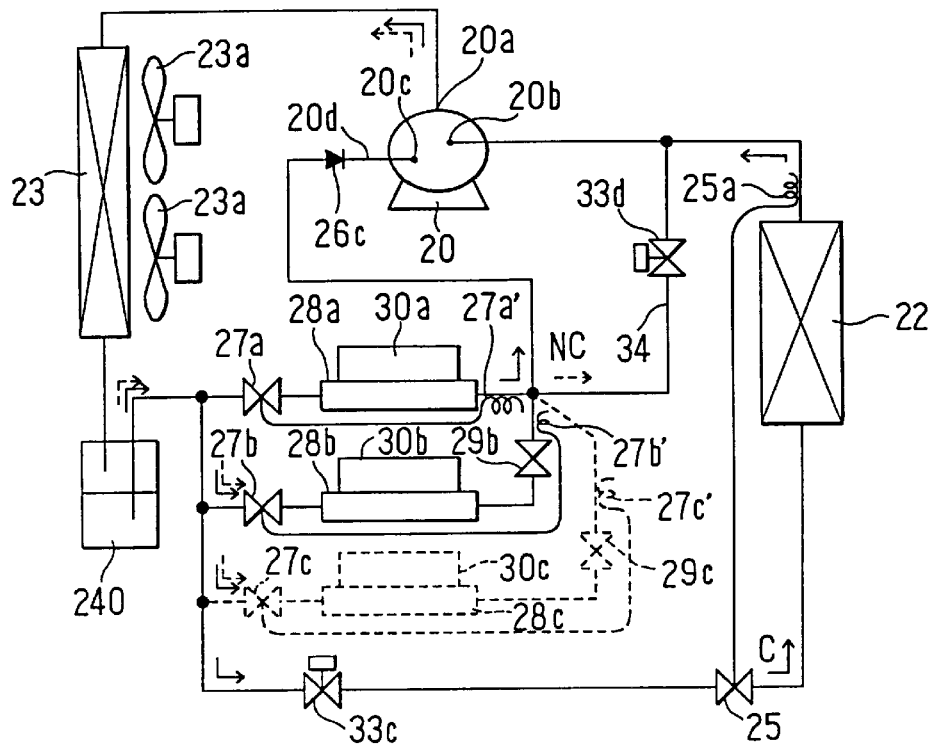
FIG. 11 is a refrigerating cycle diagram showing an eighth embodiment of the present invention.

FIG. 11 shows an eighth embodiment which is different from the seventh embodiment in that the accumulator 24 to be disposed at the intake side of the compressor 20 is eliminated and in that the receiver 240 for separating the vapor and liquid of the refrigerant to reserve the liquid refrigerant is disposed in place at the downstream side (or at the high pressure side of the cycle) of the condenser 23, thus making the so-called "receiver cycle". The remaining constructions, operations and effects are wholly identical to those of the seventh embodiment.

Ninth Embodiment

Figure 12:
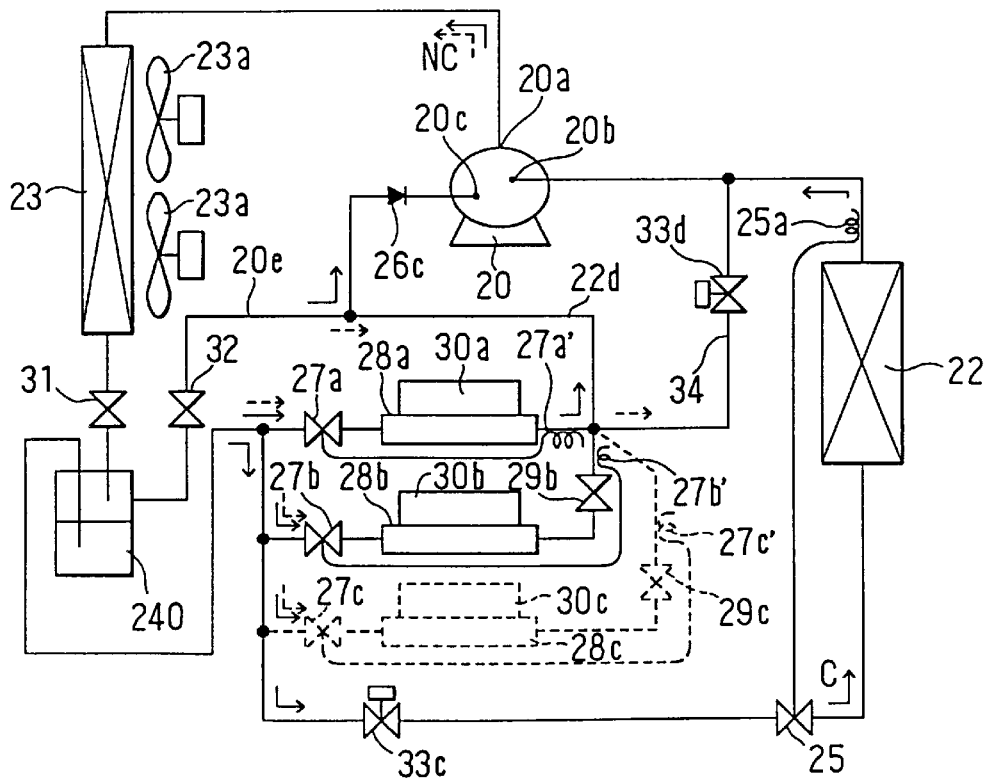
FIG. 12 is a refrigerating cycle diagram showing a ninth embodiment of the present invention.

FIG. 12 shows a ninth embodiment, which is modified from the eighth embodiment such that the pressure regulator 31 made of a fixed throttle is interposed between the downstream side of the condenser 23 and the upstream side of the receiver 240 to set the inside of the receiver 240 to an intermediate pressure. Moreover, there is provided the gas injection passage 20e for guiding out the gas refrigerant, as separated from the gas refrigerant in the receiver 240, and this gas injection passage 20e is equipped with the pressure regulator 32 (which is identical to the pressure regulator 32 of FIGS. 6 and 8). This gas injection passage 20e is made confluent with the gas injection passage 20d which is disposed at the downstream side of the heating parts cooling heat exchangers 28a to 28c, so that it may communicate with the gas injection port 20c through the check valve 26c.

In the ninth embodiment, therefore, in the cooling mode, the gas refrigerants coming from the two gas injection passages 20d and 20e are made confluent and are injected into the compressor 20. According to the ninth embodiment, the gas refrigerant in the receiver 240 can also be directly injected to enlarge (as illustrated in FIG. 6(b)) the enthalpy difference between the refrigerants to flow through the heating part cooling heat exchangers 28a to 28c and through the evaporator 22 thereby to improve the cycle efficiency better. The remaining constructions, operations and effects are identical to those of the eighth embodiment.

Tenth Embodiment

The foregoing individual embodiments have been described in case the cooling heat exchangers 28a to 28c are provided for the heating parts 30a to 30c, respectively. If the heating parts 30a to 30c have approximate heating temperatures, no problem arises even if they are integrated. Therefore, the integrated heating parts 30a to 30c may be cooled by one cooling heat exchanger.

Eleventh Embodiment

Figure 13:
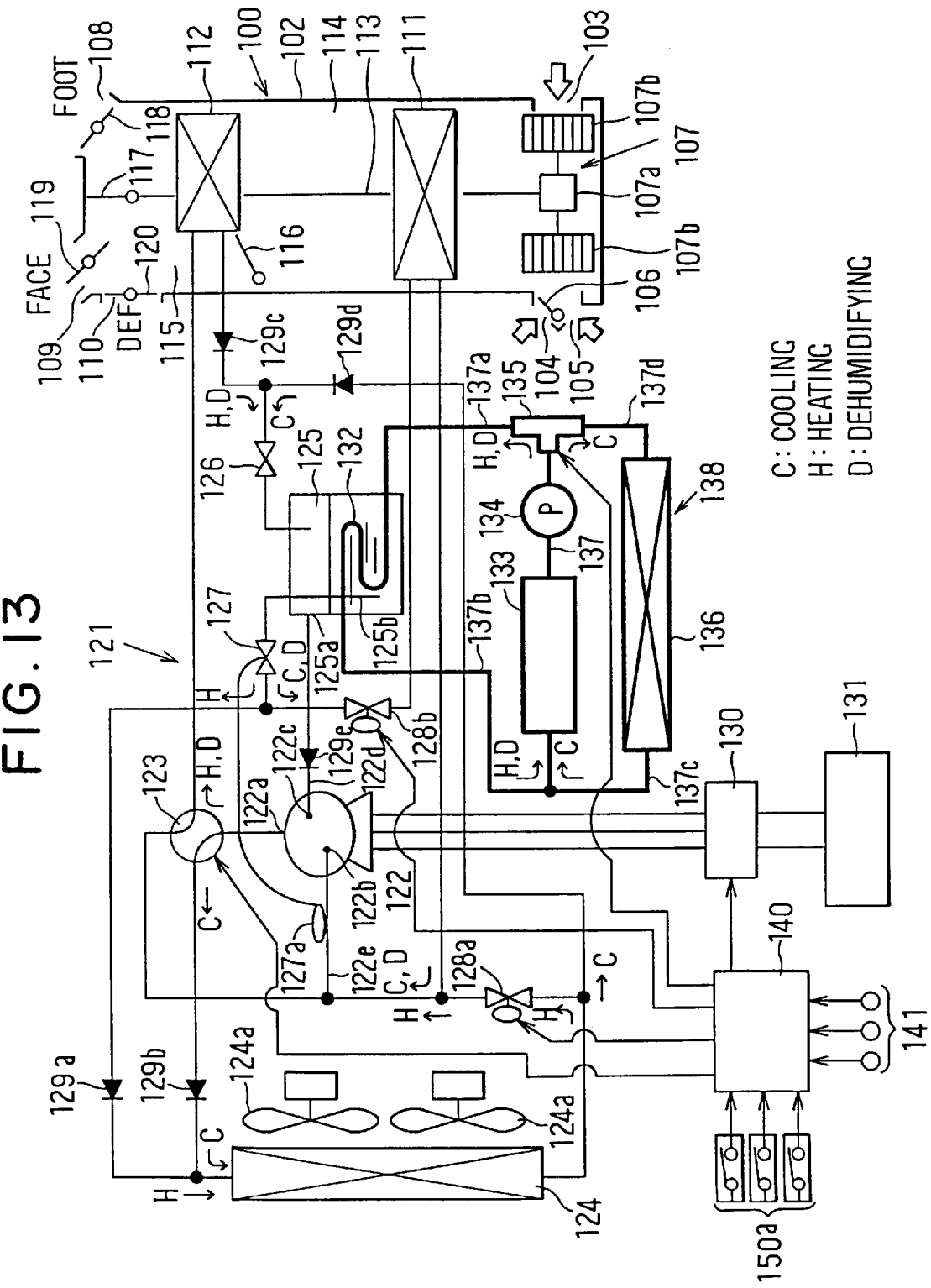
FIG. 13 is a refrigerating cycle diagram showing an eleventh embodiment of the present invention.

FIG. 13 shows an eleventh embodiment in which the present invention is applied to an air conditioner for an electric car. An air conditioner unit 100 is mounted in the compartment of the electric car, and its air conditioning duct 102 forms an air conditioning duct for introducing the conditioned air into the compartment. The air conditioning duct 102 is equipped at its one end side with inlet ports 103, 104 and 105 for inhaling the inside and outside air. The inside air inlet port 104 and the outside air inlet port 105 are opened/closed by an inside/outside air changing door 106.

Adjacent to the inlet ports 103 to 105, there is arranged a blower 107 for blowing the air into the air conditioning duct 102. This blower 107 is composed of a motor 107a and centrifugal fans 107b to be driven by the motor 107a. In the other end side of the air conditioning duct 102, on the other hand, there are formed a plurality of air outlets communicating with the inside of the compartment, that is: a foot outlet 108 for blowing the conditioned air toward the feet of the passenger in the compartment; a face outlet 109 for blowing the conditioned air toward the upper half of the passenger in the compartment; and a defroster outlet 110 for blowing the conditioned air onto the inner face of the windshield of the vehicle.

In the air conditioning duct 102 downstream of the blower 107, on the other hand, there is disposed a cooling evaporator 111. This cooling evaporator 111 is an indoor heat exchanger forming part of a refrigerating cycle 121 and functions as a cooler for dehumidifying and cooling the air in the air conditioning duct 102 in the later-described cooling mode and dehumidifying mode by the heat extracting action of the refrigerant flowing therein.

In the air conditioning duct 102 downstream of the cooling evaporator 111, on the other hand, there is disposed a heating condenser 112. This heating condenser 112 is an indoor heat exchanger 22 forming part of the refrigerating cycle 121 and functions as a heater for heating the air in the air conditioning duct 102 by the heat releasing action of the refrigerant flowing therein.

On the other hand, the air passage in the air conditioning duct 102 is separated by a partition 113 into a first air passage 114 at the side of the foot outlet 108 and a second air passage 115 at the side of the face outlet 109 and the defroster outlet 110. This halving of the air passages 114 and 115 is carried out so as: to lighten the heating load by introducing in winter the inside air at a higher temperature into the air passage 114 at the side of the foot outlet 108 from the inside inlet 103 thereby to blow the hot air to the feet; and to prevent the windshield from frosting without fail by introducing the outside air having a low humidity into the air passage 115 at the side of the defroster outlet 110.

A door 116 is provided for opening/closing the second air passage 115; a door 117 is provided for opening/closing the partition between the first and second air passages 114 and 115; and doors 118 to 120 are provided for opening/closing the air passages of the individual outlets 108, 109 and 110.

The aforementioned refrigerating cycle 121 is made as the heat pump type refrigerating cycle for cooling and heating the inside of the compartment with the cooling evaporator 111 and the heating condenser 112, and is provided with the following devices in addition to the evaporator 111 and the condenser 112.

Specifically, the refrigerating cycle 121 is further provided with: a refrigerant compressor 122; a solenoid four-way valve 123 for changing the flows of refrigerant; an outdoor heat exchanger 124; a vapor-liquid separator 125 performing functions to separate the vapor and liquid of the refrigerant and to reserve the liquid refrigerant; a fixed throttle (or first pressure regulator means) 126 for pressure-regulating the condensed refrigerant at the higher pressure side of the cycle, as introduced into the vapor-liquid separator 125, to an intermediate pressure (e.g., about 4 to 15 $Kg/cm^2$); a temperature actuated type expansion valve (or second pressure regulator means) 127; solenoid valves 128a and 128b; and check valves 129a to 129e. The fixed throttle 126 can be exemplified by a throttle such as an orifice.

Of the functional parts to be mounted on the electric car, on the other hand, there is provided a cooling system 138 for cooling a heating part 133. This heating part 133 is exemplified by a semiconductor switch element (e.g., a power transistor) of a rotational speed controlling inverter of an electric car driving AC motor (not shown).

This cooling system 138 is equipped with: a water refrigerant heat exchanger 132 arranged in the vapor-liquid separator 125; an electric water pump 134 for circulating the cooling water; a three-way valve (or water circuit changing means) 135 of solenoid valve type; a radiator 136 for radiating the heat of the cooling water into the outside air; and water passages 137 and 137a to 137d. By the changing action of the three-way valve 135, the cooling water, as heated by the heating part 133, is delivered to either the water cooler heat exchanger 132 or the radiator 136.

The outdoor heat exchanger 124 is arranged outside of the compartment of the electric car so that it may exchange the heat with the outside air which is blown by an electric outdoor fan 124a. Moreover, the refrigerant compressor 122 is an electric type compressor which packages the not-shown AC motor in its sealed case so that it is driven by the motor to inhale, compress and discharge the refrigerant.

The AC motor of the refrigerant compressor 122 is supplied with an AC voltage by an inverter 130, which adjusts the frequency of the AC voltage to change the rotational speed of the motor continuously. Thus, the inverter 130 makes RPM adjusting means of the compressor 122 and is supplied with a DC voltage from a car-mounted battery 131.

The refrigerant compressor 122 is provided with: a discharge port 122a for discharging the compressed refrigerant; an intake port 122b for inhaling the evaporated refrigerant at the lower pressure side of the cycle; and a gas injection port 122c for injecting the gas refrigerant, as separated in the vapor-liquid separator 125, under the intermediate pressure. This gas injection port 122c has communication with a gas refrigerant exit 125a over the vapor-liquid separator 125 by way of a gas injection passage 122d having the check valve 129e.

In a refrigerant intake passage 122e connected to the intake port 122b, on the other hand, there is disposed a temperature sensing cylinder 127a of the temperature actuated type expansion valve 127, the opening of which is so adjusted that the degree of superheat of the refrigerant in the intake passage 122e may take a predetermined value. On the other hand, the power to the inverter 130 is controlled by an air conditioning control unit 140.

This air conditioning control unit 140 is an electronic control unit which is composed of a microcomputer and its peripheral circuits to control the changing action of the four-way valve 123 and the ON/OFF of the solenoid valves 128a and 128b. In the present embodiment, the four-way valve 123 and the solenoid valves 128a and 128b constitute the "route changing means for changing refrigerant circulating routes".

To the control unit 140, there are inputted the sensor signals of an air conditioning sensor group 141 including: an ambient temperature sensor for detecting the ambient temperature; an evaporator temperature sensor for detecting the temperature of the air just blown from the cooling evaporator 111; and a discharge pressure sensor for detecting the pressure (or the higher pressure of the cycle) of the refrigerant discharged from the compressor 121.

Figure 14:
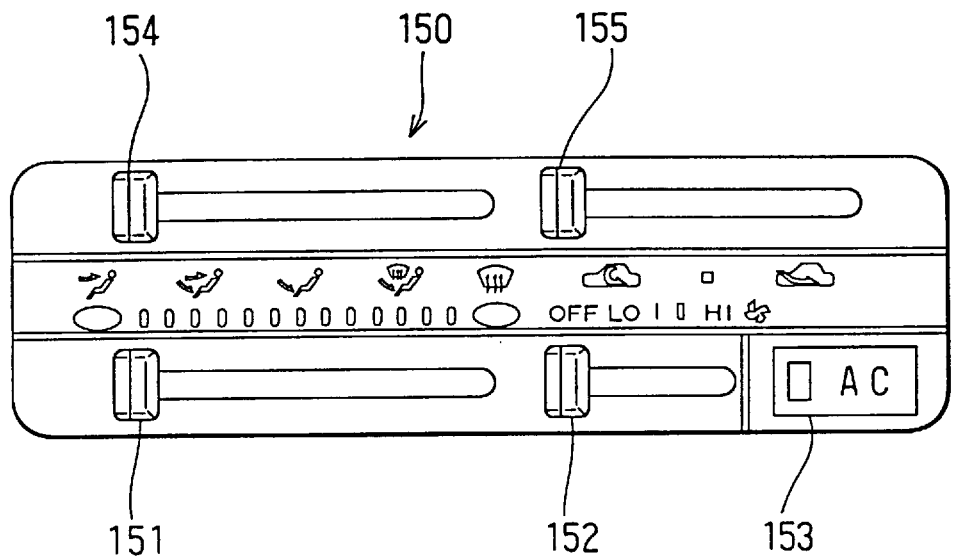
FIG. 14 is a front elevation of an air conditioner control panel to be used in the eleventh embodiment.

The signals from the individual levers and switch group 150a of an air conditioning control panel 150 (as shown in FIG. 14), as disposed in the vicinity of the driver's seat in the compartment, are also inputted to the control unit 140.

The electric connections with the air conditioning control unit 140 are not shown in FIG. 13, but the operations of the doors 104, 126, 117, 118, 119 and 120, the blower 107, the outdoor fan 124a, the water pump 134 and the three-way valve 135 are also controlled by the control unit 140.

Figure 15:
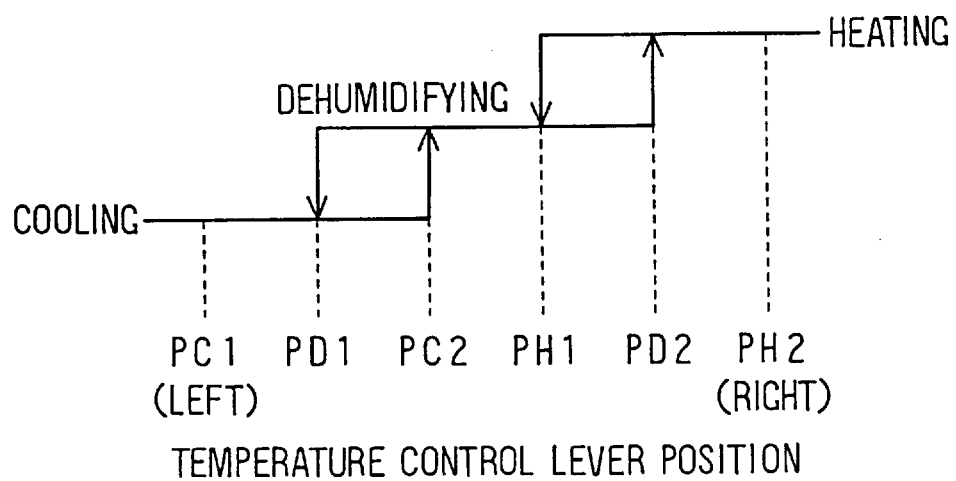
FIG. 15 is a characteristic diagram of all the operation regions of a temperature control lever in the air conditioner control panel of FIG. 14.

The air conditioning control panel 150, as shown in FIG. 14, is equipped with the following control members to be manually operated by the passenger. Reference numeral 151 designates a temperature control lever for setting a target value of the temperature of the air to be blown into the compartment. In this embodiment, the control lever 151 is constructed to set the target value of the RPM to be adjusted of the electric compressor 122. In response to the target value set by the operation position of the temperature control lever 151, moreover, the actions of the four-way valve 123 and the solenoid valves 128a and 128b are controlled to change the running modes of the refrigerating cycle. By moving the operation position of the lever 151 rightward from the lefthand side, as shown in FIG. 15, it is possible to set the cooling mode, the dehumidifying mode and the heating mode sequentially.

Figure 16:
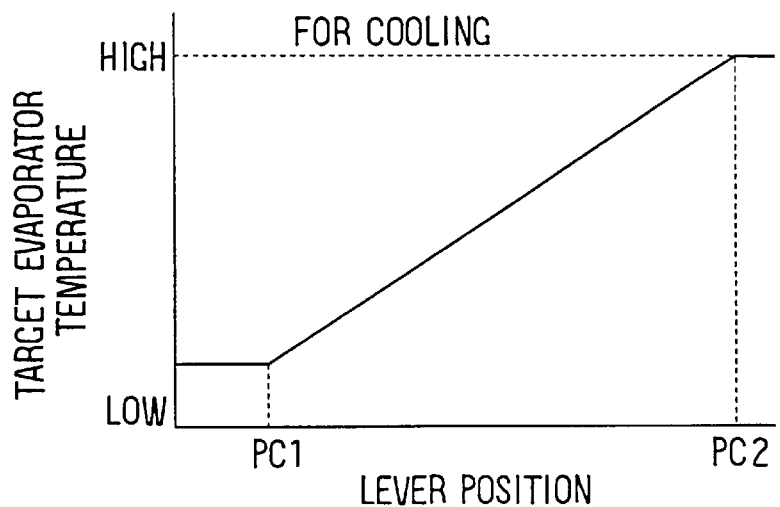
FIG. 16 is a characteristic diagram illustrating a cooling region of the same temperature control lever.
Figure 17:
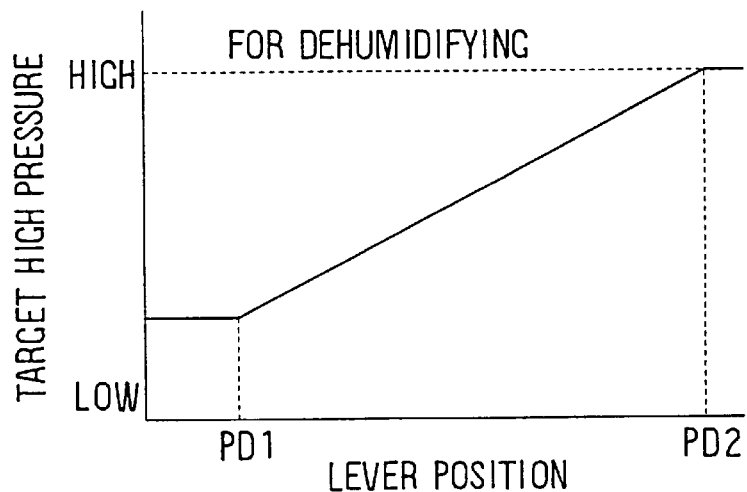
FIG. 17 is a characteristic diagram illustrating a dehumidifying region of the same temperature control lever.
Figure 18:
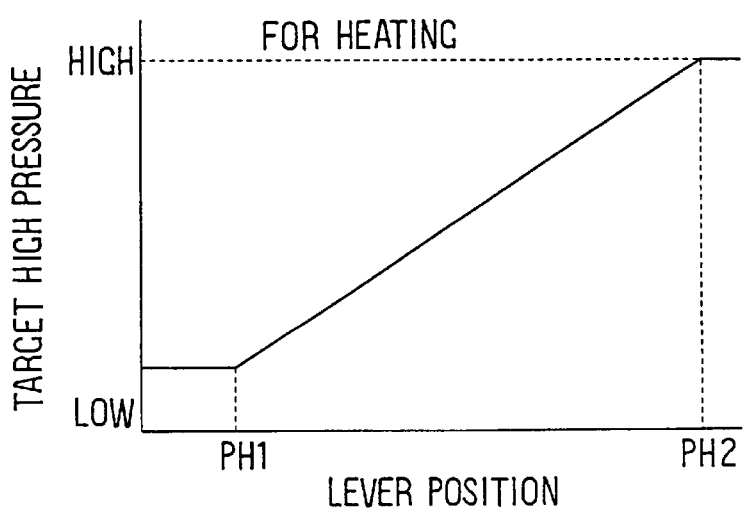
FIG. 18 is a characteristic diagram illustrating a heating region of the same temperature control lever.

By moving the operation position of the temperature control lever 151, as shown in FIGS. 16, 17 and 18, the target temperature of the air to be blown from the evaporator is set at the cooling time, and the target high pressure is set at the dehumidifying time and the heating time.

The operation position signal of the temperature control lever 151 is inputted to the control unit 140, and the control unit 140 controls the RPM of the compressor 122 and the blown air temperature so that the actual temperature of the blown air of the evaporator or the actual high pressure, as detected by the sensor group 141, may be equal to the aforementioned target value.

Reference numeral 152 designates a speed change lever of the blower 107; numeral 153 an air conditioner switch for turning ON/OFF the run of the compressor 122; numeral 154 a conditioned air blow mode changing lever for opening/closing the outlet changing doors 118 to 120; and numeral 155 an inside/outside air changing lever for opening/closing the inside/outside air changing door 106.

Here will be described the operations of the aforementioned construction. When the air conditioner switch 153 is turned ON, its signal is inputted to the control unit 140 to start the compressor 122. When the temperature control lever 151 is operated from position PC1 up to position PC2 of FIGS. 15 and 16, the cooling mode is set. In this cooling mode, the four-way valve 123 and the solenoid valves 128a and 128b are set into the state of the cooling mode of FIG. 19 by the control unit 140 so that the refrigerant flows on a route, as indicated by arrows C, in the refrigerating cycle of FIG. 13.

Specifically, the superheated gas refrigerant, as discharged from the compressor 122, at a high temperature and under a high pressure flows through the four-way valve 123 and the check valve 129b into the outdoor heat exchanger 124, in which it exchanges the heat with the outside air blown by the outdoor fan 124a and condenses. Next, the refrigerant having flown out of the outdoor heat exchanger 124 is pressure-regulated through the check valve 129d into the vapor-liquid two-phase state under an intermediate pressure by the fixed throttle 126 because the solenoid valve 128a is closed.

This vapor-liquid two-phase refrigerant under the intermediate pressure flows into the vapor-liquid separator 125, in which it is separated into the saturated gas refrigerant and the saturated liquid refrigerant. The gas refrigerant flows from the gas refrigerant exit 125a over the vapor-liquid separator 125 through the gas injection passage 122d and the check valve 129e to the gas injection port 122c, so that the gas refrigerant under the intermediate pressure is injected from the port 122c to the portion midway of the compression stroke of the compressor 122.

On the other hand, the liquid refrigerant in the vapor-liquid separator 125 flows out of a vapor-liquid exit 125b, which is opened in the vicinity of the bottom portion of the vapor-liquid separator 125, and is pressure-regulated by the temperature actuated type expansion valve 127 until it flows through the solenoid valve 128b into the evaporator 111. In this evaporator 111, the refrigerant extracts the heat from the blown air of the blower 107 and evaporates. The cool air, as cooled by the evaporator 111, is usually blown out of the face outlet 109 into the compartment to cool the inside of the same.

The gas refrigerant, as evaporated in the evaporator 111, is inhaled from the refrigerant intake passage 122e into the intake port 122b of the compressor 122. At this time, the temperature of the refrigerant, as inhaled by the compressor, is sensed by the temperature sensing cylinder 127a, which is set in the refrigerant intake passage 122e, and is transmitted to the expansion valve 127. As a result, this expansion valve 127 adjusts the flow rate of the refrigerant to flow into the evaporator 111 so that the refrigerant into the compressor may take a predetermined degree of superheat.

In the cooling system 138 of the heating part 133, on the other hand, the three-way valve 135 is then controlled to close the water passage 137a at the side of the water refrigerant heat exchanger 132 but to open the water passage 137d at the side of the radiator 136. As a result, the cooling water flows on the route, as indicated by arrows C in FIG. 13, into the radiator 136. Thus, the lost calorie, as generated in the heating part 133 and exchanged with the water, is released to the atmosphere through the radiator 136.

Thus, at the cooling time, the lost calorie at the heating part 133 is released through the radiator 136 to the atmosphere to cause no adverse effect such as the rise in the compression power, as might otherwise be caused by the excessive increase in the heat consumption at the side of the refrigerating cycle.

When the temperature control lever 151 is then operated from position PH1 up to position PH2 of FIGS. 15 and 18, the heating mode is set. In this heating mode, the four-way valve 123 and the solenoid valves 128a and 128b are set in the state of the heating mode of FIG. 19 by the control unit 140 so that the refrigerant flows on the route, as indicated by arrows H, in the refrigerating cycle of FIG. 13.

Specifically, the gas refrigerant, as discharged from the compressor 122, flows through the four-way valve 123 into the condenser 112 at the compartment side, in which it exchanges (or releases) the heat with the air blown from the blower 107 and condenses. The hot air, as heated by the gas refrigerant, is blown mainly from the foot outlet 108 into the compartment to heat the inside of the same.

Moreover, the refrigerant having flown out of the condenser 112 is pressure-regulated through the check valve 129c by the fixed throttle 126 into the vapor-liquid two-phase state under an intermediate pressure.

This vapor-liquid two-phase refrigerant under the intermediate pressure flows into the vapor-liquid separator 125, in which the separated gas refrigerant flows from the gas refrigerant exit 125a over the vapor-liquid separator 125 through the gas injection passage 122d and the check valve 129e until it is sucked into the gas injection port 122c.

On the other hand, the liquid refrigerant in the vapor-liquid separator 125 flows out of the vapor-liquid exit 125b and is pressure-regulated by the temperature actuated type expansion valve 127 until it flows through the check valve 129a into the outdoor heat exchanger 124. In this outdoor heat exchanger 124, the refrigerant extracts the heat from the blown air (or outside air) of the outdoor fan 124a and evaporates.

The gas refrigerant having evaporated in the outdoor heat exchanger 124 flows through the solenoid valve 128a until it is inhaled from the refrigerant intake passage 122e into the intake port 122b of the compressor 122.

In the cooling system 138 of the heating part 133, on the other hand, the three-way valve 135 is then controlled by the control unit 140 to open the water passage 137a at the side of the water refrigerant heat exchanger 132 and to close the water passage 137d at the side of the radiator 136. As a result, the cooling water flows on the route, as indicated by arrows H in FIG. 13, into the water refrigerant heat exchanger 132. Thus, the lost calorie, as generated in the heating part 133 and exchanged with the heat of water, is extracted in the water refrigerant heat exchanger 132 by the liquid refrigerant in the vapor-liquid separator 125. By the heat extraction of the liquid refrigerant in the vapor-liquid separator 125, the heating ability can be effectively improved, as will be described in the following.

Next, when the temperature control lever 151 is operated from position PD1 up to position PD2 of FIGS. 15 and 17, the dehumidifying mode is set. In this dehumidifying mode, the four-way valve 123 and the solenoid valves 128a and 128b are set in the state of the dehumidifying mode of FIG. 19 by the control unit 140 so that the refrigerant flows on the route, as indicated by arrows D, in the refrigerating cycle of FIG. 13.

Specifically, the gas refrigerant, as discharged from the compressor 122, flows through the four-way valve 123 into the condenser 112 at the compartment side, in which it exchanges (or releases) the heat with the air blown by the blower 107 and condenses. Moreover, the refrigerant having flown out of the condenser 112 flows through the check valve 129c and is pressure-regulated by the fixed throttle 126 into a vapor-liquid two-phase state under an intermediate pressure.

This vapor-liquid two-phase refrigerant under the intermediate pressure flows into the vapor-liquid separator 125, in which the gas refrigerant is separated to flow from the gas refrigerant exit 125a over the vapor-liquid separator 125 through the gas injection passage 122d and the check valve 129e until it is sucked into the gas injection port 122c.

On the other hand, the liquid refrigerant in the vapor-liquid separator 125 flows out of the vapor-liquid exit 125b and is pressure-regulated by the temperature actuated type expansion valve 127 until it flows through the open solenoid valve 128b into the evaporator 111. Since the solenoid valve 128a is closed at this time, the refrigerant, as pressure-regulated by the temperature actuated type expansion valve 127, will not flow to the outdoor heat exchanger 124.

The refrigerant having flown into the evaporator 111 extracts the heat from the blown air of the blower 107 until it is inhaled into the compressor 122.

At the dehumidifying time, as described above, the refrigerant flows through the evaporator 111 and the condenser 112, as disposed in the indoor air conditioner unit 101, so that the blown air of the blower 107 is at first cooled and dehumidified by the evaporator 111 and then heated again by the condenser 112. Here, the calorie, as released from the refrigerant in the condenser 112, is the summation of the extracted calorie in the evaporator 111 and the power consumption of the compressor 122 so that the air temperature at the exit side of the condenser 112 is higher than the temperature of the air to be sucked from the inlet ports 103, 104 and 105. As a result, the heating operation can be performed simultaneously with the dehumidifying operation.

In the cooling system 138 of the heating part 133, on the other hand, the three-way valve 135 is controlled by the control unit 140 to open the water passage 137a at the side of the water refrigerant heat exchanger 132 and to close the water passage 137d at the side of the radiator 136 so that the cooling water flows on the route, as indicated by arrows D in FIG. 13, into the water refrigerant heat exchanger 132. As a result, the lost calorie, as generated in the heating part 133 and exchanged with the heat of water, is extracted in the water refrigerant heat exchanger 132 by the liquid refrigerant in the vapor-liquid separator 125. Thus, the heating capacity of the condenser 112 can be effectively improved as at the heating time by the heat extraction to the liquid refrigerant.

Figures 19, 20:
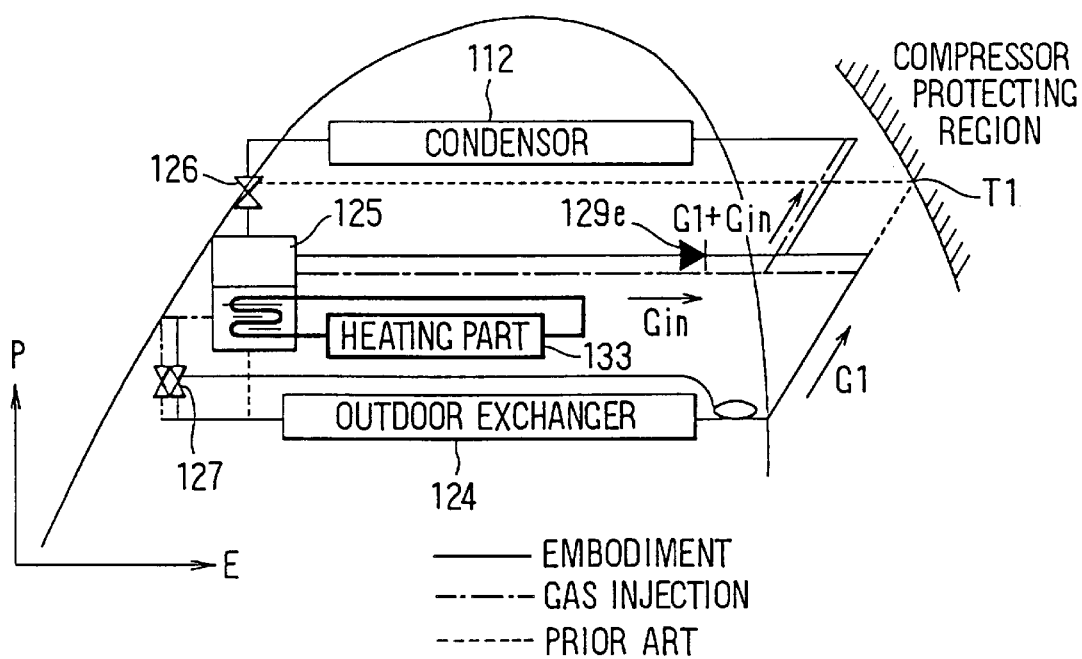
FIG. 19 is a diagram for explaining valves to be used in the eleventh embodiment.
FIG. 20 is a Mollier diagram illustrating the refrigerating cycle in the eleventh embodiment in comparison with the prior art.

Next, the improvement in the heating capacity at the low outside temperature according to the feature of the present invention will be described with reference to the Mollier diagram of FIG. 20. In the heat pump system of the prior art, if the outside temperature lowers at the heating time, the suction pressure drops to enlarge the capacity to the refrigerant so that a refrigerant circulation G1 to be inhaled by the compressor 122 is reduced to lower the heating capacity. Moreover, the compression ratio is enlarged by the drop in the suction pressure so that the temperature Td of the refrigerant to be discharged by the compressor 122 rises to the temperature point T1 in a compressor protecting region, as illustrated in FIG. 20. For the protection of the compressor 122, therefore, the compressor 122 cannot be used to its maximum ability (or maximum RPM).

In order to solve this problem, the aforementioned prior art have been investigated by making a gas injection cycle to return (or inject) the gas refrigerant, as separated under the intermediate pressure, to midway of the compression stroke of the compressor 122.

According to this gas injection cycle, the flow rate Gin of the refrigerant, as gas-injected, is added to the flow rate G1 of the refrigerant, as inhaled by the compressor 122, and the refrigerant, as compressed and heated halfway, can be cooled with the saturated gas refrigerant, as injected, so that the compression capacity of the compressor 122 can be augmented. As a result, the compression workload can be augmented to increase the refrigerant heat release in the condenser 112 thereby to increase the heating capacity.

In accordance with this increase in the heating capacity, however, the compression power by the increase in the compression ratio increases to raise the power consumption in the compressor 122. The most important subject of the electric car is to elongate the running distance for each battery charging. Hence, the increase in the power consumption is a serious problem to the electric car.

In the present embodiment, on the other hand, in the water refrigerant heat exchanger 132 disposed in the vapor-liquid separator 125, the waste heat of the heating part 133 other than the air conditioning system is recovered and extracted by the liquid refrigerant. Here, the heat is extracted by the refrigerant in the liquid phase so that the waste heat can be efficiently recovered in the mode of latent heat. Since the waste heat is extracted by the liquid refrigerant under the intermediate pressure in the vapor-liquid separator 125, the temperature of the saturated refrigerant rises to raise the intermediate pressure so that the flow rate Gin of the injected refrigerant can be increased to increase the heat release of the refrigerant in the condenser 112 and accordingly the heating capacity.

As a result of the rise in the intermediate pressure, as described above, the average suction pressure in the compressor 122 can rise to reduce the compression ratio so that the compression power can be suppressed to increase the resulting performance coefficient. As a result, the efficiency of the cycle can be improved together with the heating capacity while suppressing the power consumption.

At the cooling time and at the dehumidifying time, moreover, the resulting performance coefficient can be raised to improve the performance by the gas injection into the compressor 122.

Twelfth Embodiment

Figure 21:
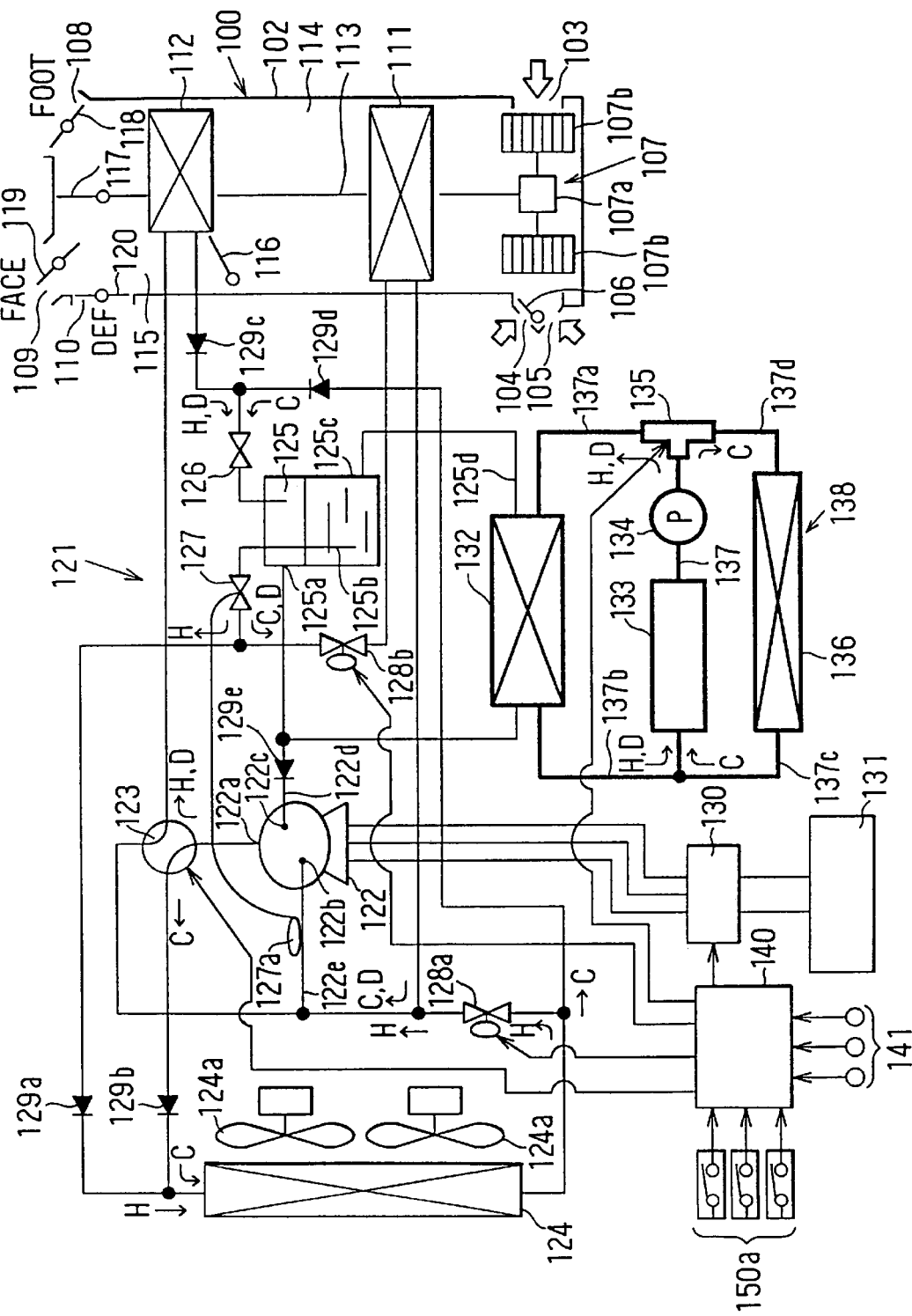
FIG. 21 is a refrigerating cycle diagram showing a twelfth embodiment of the present invention.

FIG. 21 shows a twelfth embodiment, which is different from the eleventh embodiment in that the water refrigerant heat exchanger 132 is made separate of the vapor-liquid separator 125 and is disposed outside of the vapor-liquid separator 125. Specifically, in the bottom portion of the vapor-liquid separator 125, there is additionally formed a second liquid refrigerant exit 125c, so that the liquid refrigerant in a refrigerant piping 125d connecting the second liquid refrigerant exit 125c and the upstream of the check valve 129e is cooled to vaporize by the water refrigerant heat exchanger 132, as disposed outside of the vapor-liquid separator 125.

In the twelfth embodiment, therefore, there are formed in parallel a route for introducing the gas refrigerant in the vapor-liquid separator 125 from the gas refrigerant exit 125a into the gas injection passage 122d and a route for introducing the gas refrigerant, as vaporized in the water refrigerant heat exchanger 132, into the gas injection passage 122d, so that the gas injection into the compressor 122 is performed via the parallel routes. The remaining constructions, operations and effects are all identical to those of the eleventh embodiment.

Thirteenth Embodiment

Figure 22:
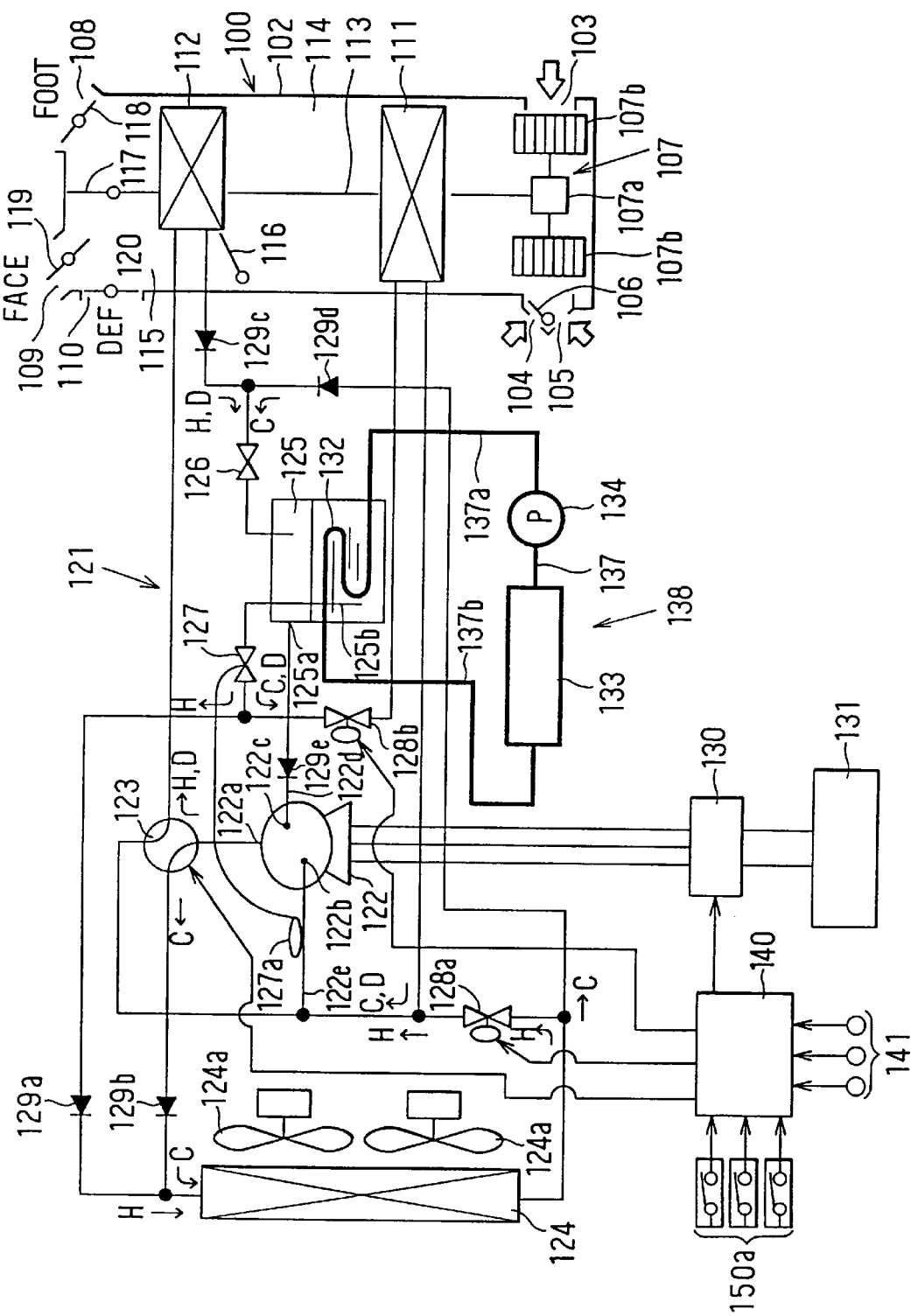
FIG. 22 is a refrigerating cycle diagram showing a thirteenth embodiment of the present invention.

FIG. 22 shows a thirteenth embodiment, which is different from the eleventh embodiment in that the radiator 136 and the passage changing three-way valve 135 are eliminated in the cooling system of the heating part 133 and in that a closed circuit is formed for circulating the cooling water at all times in the water refrigerant heat exchanger 132.

In the thirteenth embodiment, more specifically, at the cooling time, too, the lost calorie of the heating part 133 is recovered by the refrigerant under the intermediate pressure so that the compression workload increases due to the increase in the excess calorie to be extracted at the cooling time. However, the heating part 133 can be cooled even if the radiator 136 and the passage changing three-way valve 135 are disused, so that the cost can be drastically lowered by the reduction in the number of parts.

The operations and effects of the improvement of the capacity at the heating time are identical to those of the eleventh and twelfth embodiments.

Fourteenth Embodiment

Figure 23:
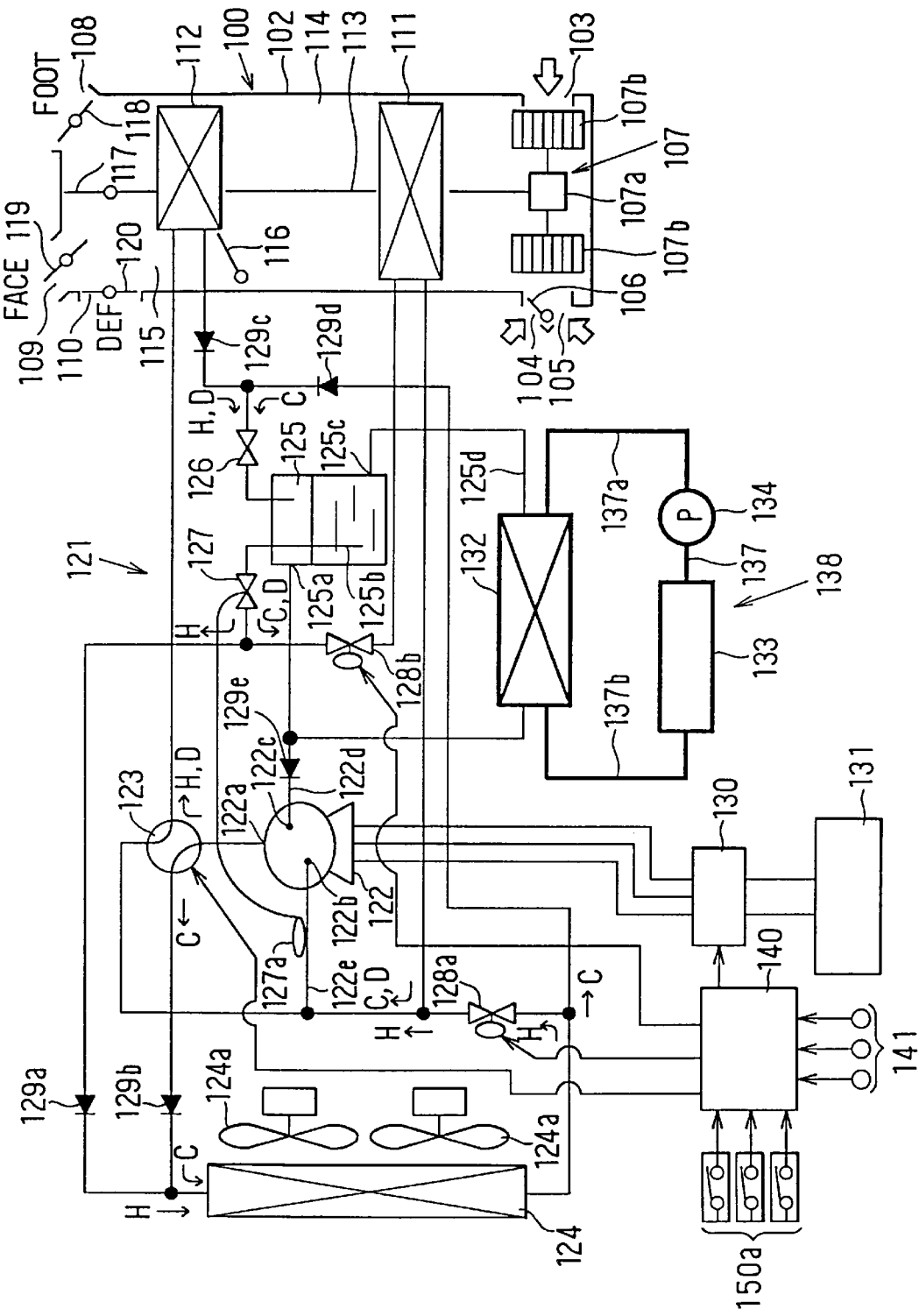
FIG. 23 is a refrigerating cycle diagram showing a fourteenth embodiment of the present invention.

FIG. 23 shows a fourteenth embodiment, which is different from the twelfth embodiment in that the radiator 136 and the passage changing three-way valve 135 are eliminated in the cooling system of the heating part 133 so that the cooling water may always be circulated in the water refrigerant heat exchanger 132. As a result, the number of parts can be reduced as in the thirteenth embodiment.

In the fourteenth embodiment, the water refrigerant heat exchanger 132 may be replaced by a heat exchanger for causing the refrigerant under the intermediate pressure to exchange the waste heat of the heating part 133 directly. Thus, the number of parts can be further reduced.

Fifteenth Embodiment

Figure 24:
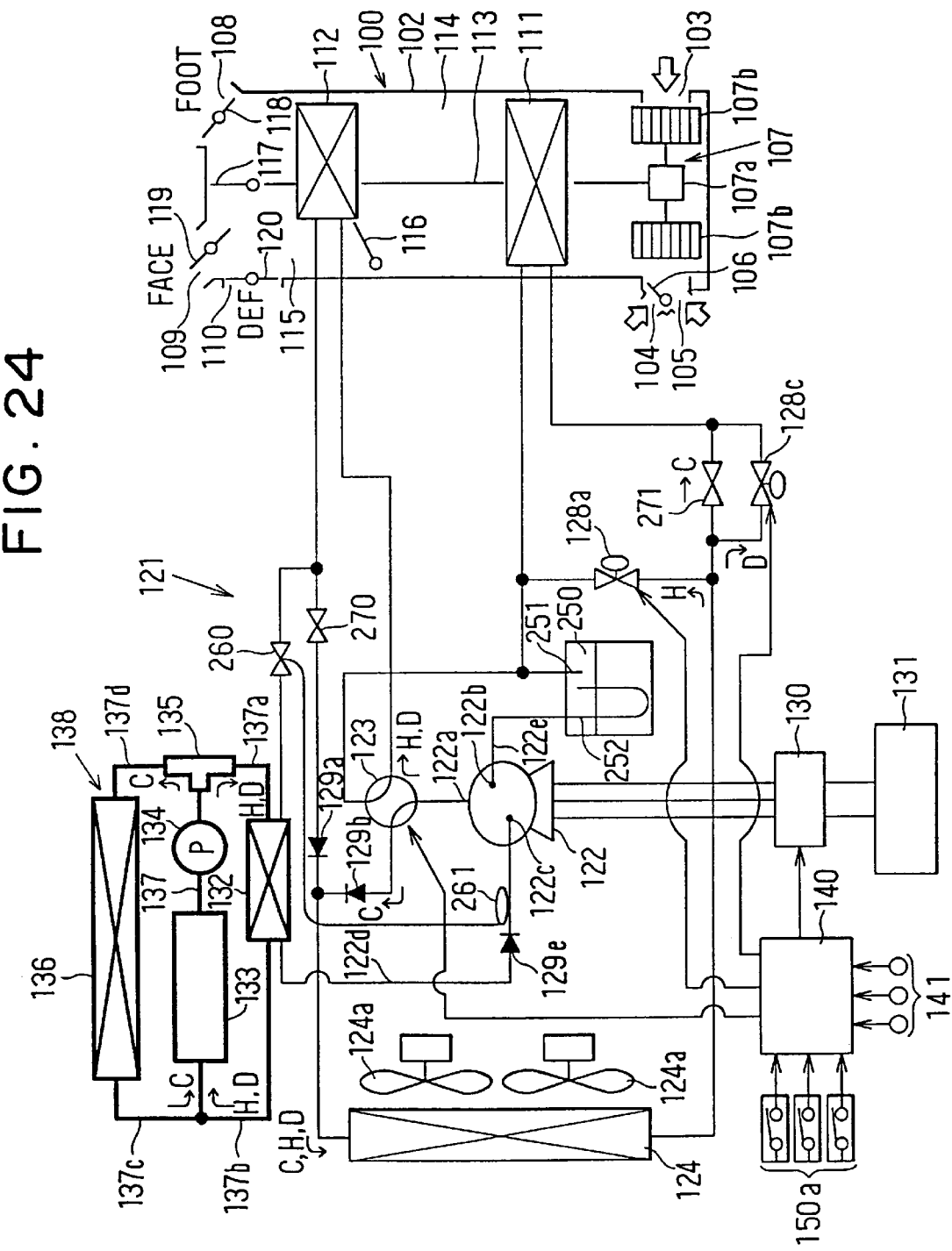
FIG. 24 is a refrigerating cycle diagram showing a fifteenth embodiment of the present invention.

FIG. 24 shows a fifteenth embodiment. Any of the eleventh to fourteenth embodiments has been described on the heat pump system which is equipped with the vapor-liquid separator 125 for separating the vapor and liquid of the refrigerant under the intermediate pressure. In the fifteenth embodiment, on the other hand, this separator 125 for the vapor and liquid under the intermediate pressure is eliminated and replaced by a vapor-liquid separator (as generally called the "accumulator") 250 which is connected to the intake port 122b of the compressor 122 for separating the vapor and liquid of the evaporated refrigerant at a lower pressure side.

In accordance with this vapor-liquid separator 250 thus provided, the cycle construction is changed in the following. Specifically, the first pressure regulator means for regulating the pressure of the condensed refrigerant at the higher pressure side of the refrigerating cycle to an intermediate pressure (about 4 to 10 $Kg/cm^2$) is exemplified in the present embodiment by a temperature actuated type expansion valve 260. The refrigerant, the pressure of which has been regulated to the intermediate pressure after having passed through the temperature actuated type expansion valve 260, is guided into the water refrigerant heat exchanger 132, in which the gas refrigerant thus heated evaporated is further guided via the gas injection passage 122d into the gas injection port 122c. The water passage construction of the cooling system 138 for circulating the water (or medium) in the water refrigerant heat exchanger 132 is identical to those of FIG. 13 and 21.

The temperature actuated type expansion valve has a temperature sensing cylinder 261 for sensing the temperature of the refrigerant to be introduced into the gas injection port 122c so that the degree of superheat of the refrigerant to be introduced into the gas injection port 122c may be adjusted to a predetermined value.

In parallel with this temperature actuated type expansion valve 260, moreover, there is connected a fixed throttle 270 acting as second pressure regulator means, the downstream side of which is connected through the check valve 129a to the upstream side of the outdoor heat exchanger 124. Downstream side of this outdoor heat exchanger 124, there are arranged in parallel the solenoid valve 128a and a fixed throttle 271 acting as third pressure regulator means. In parallel with this fixed throttle, moreover, there is arranged in parallel a solenoid valve 128c.

Moreover, these fixed throttle 271 and solenoid valve 128c are connected with the upstream side of the evaporator 111. The downstream side of the evaporator 111 and the downstream side of the solenoid valve 128a are made confluent and then connected to the entrance 251 of the vapor-liquid separator 250. A gas refrigerant exit 252 for delivering the gas refrigerant in the vapor-liquid separator 250 is connected through the refrigerant intake passage 122e to the intake port 122b of the compressor 122. The remaining points are identical or equivalent to those of the eleventh and twelfth embodiments of FIGS. 13 and 21, and the description will be omitted by designating the same by the identical reference numerals.

Here will be described the operations of the fifteenth embodiment. At the cooling time, the four-way valve 123 and the solenoid valves 128a and 128b are set in the state of the cooling mode of FIG. 25 by the control unit 140 so that the refrigerant flows on the route, as indicated by arrows C in FIG. 24.

Specifically, the superheated gas refrigerant, as discharged from the compressor 122, at a high temperature and under a high pressure flows through the four-way valve 123 and the check valve 129b into the outdoor heat exchanger 124, in which it exchanges the heat with the outside air blown by the outdoor fan 124a and condenses. Next, the refrigerant having flown out of the outdoor heat exchanger 124 is regulated to a low pressure by a fixed throttle 271 (or third pressure regulator means), because the solenoid valves 128a and 128c are closed, until it flows into the evaporator 111.

In this evaporator 111, the refrigerant extracts the heat from the blown air of the blower 107 and evaporates. The cool air, as cooled by the evaporator 111, is usually blown out of the face outlet 109 into the compartment to cool the inside of the same.

The gas refrigerant having evaporated in the evaporated 111 flows into the vapor-liquid separator 250, in which the vapor and liquid of the refrigerant are separated so that the liquid refrigerant is reserved in the vapor-liquid separator 250 whereas the gas refrigerant flows through the exit 252 and is sucked from the refrigerant intake passage 122e into the intake port 122b of the compressor 122.

In the cooling system 138 of the heating part 133, on the other hand, the three-way valve 135 is then controlled by the control unit 140 to close the water passage 137a at the side of the water refrigerant heat exchanger 132 and to open the water passage 137d at the side of the radiator 136 so that the cooling water flows on the route, as indicated by arrows C in FIG. 13, into the radiator 136. As a result, the lost calorie, as generated in the heating part 133 and exchanged with the water, is released from the radiator 136 into the atmosphere.

Thus, at the cooling time, the lost heat at the heating part 133 is released by the radiator 136 into the atmosphere to cause no adverse affect such as the rise in the compression power due to the increase in the excess heat extraction at the side of the refrigerating cycle.

Figures 25, 26:
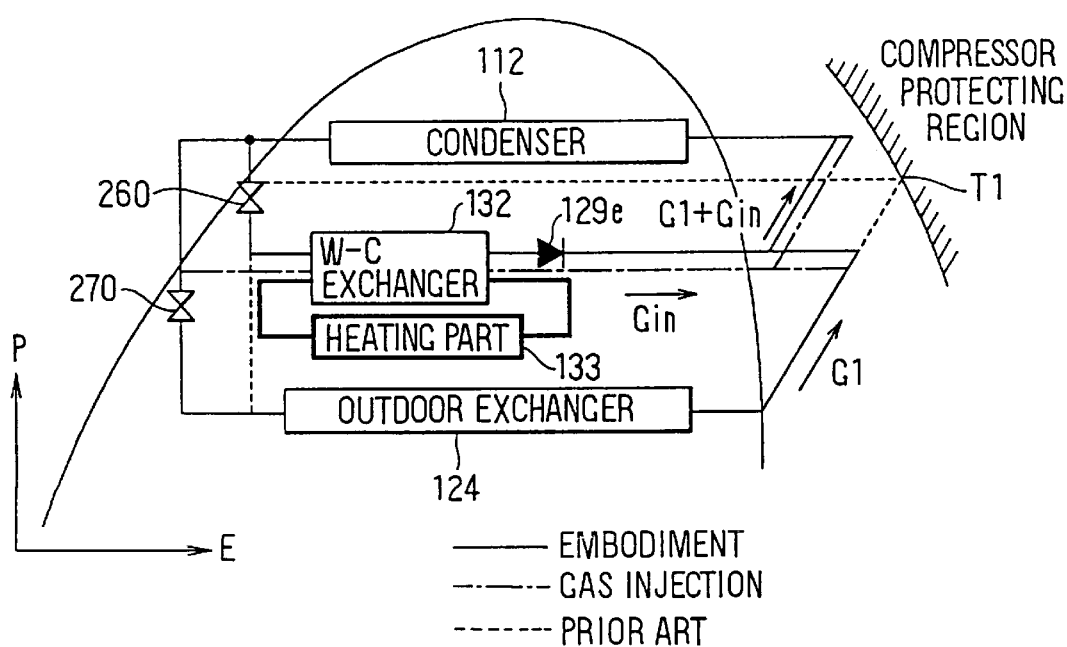
FIG. 25 is a diagram for explaining the operations of valves to be used in the fifteenth embodiment.
FIG. 26 is a Mollier diagram illustrating the refrigerating cycle in the fifteenth embodiment in comparison with the prior art.

Next, at the heating time, the four-way valve 123 and the solenoid valves 128a and 128c are set in the state of the heating mode of FIG. 25 by the control unit 140 so that the refrigerant flows on the route, as indicated by arrows H in FIG. 24.

Specifically, the gas refrigerant, as discharged from the compressor 122, flows through the four-way valve 123 into the condenser 112 at the compartment side, in which it exchanges (or releases) the heat with the air, as blown from the blower 107, and condenses. The hot air, as heated by the heat release of the gas refrigerant, is blown mainly from the foot outlet 108 into the compartment to heat the inside of the same.

The refrigerant having flown out of the condenser 112 flows into the temperature actuated type expansion valve 260 and the fixed throttle 270 in parallel, so that the refrigerant is regulated to an intermediate pressure in the temperature actuated type expansion valve 260 but to a low pressure in the fixed throttle 270. The refrigerant under the intermediate pressure, as regulated by the temperature actuated type expansion valve 260, then flows into the water refrigerant heat exchanger 132. At this time, in the cooling system 138 of the heating part 133, the three-way valve 135 is controlled by the control unit 140 to open the water passage 137a at the side of the water refrigerant heat exchanger 132 and to close the water passage 137d at the side of the radiator 136 so that the cooling water flows on the route, as indicated by arrows H in FIG. 24, into the water refrigerant heat exchanger 132.

As a result, the lost calorie, as generated in the heating part 133 and exchanged with the heat of the water, is extracted by the aforementioned refrigerant under the intermediate pressure. The gas refrigerant, as evaporated by this heat extraction, is sucked through the gas injection 122d and the check valve 129e into the gas injection port 122c. By injecting the gas refrigerant under the intermediate pressure, as cooled in the water refrigerant heat exchanger 132, into the compressor 122, the heating capacity can be effectively improve by the same reasoning as that of the foregoing eleventh embodiment.

On the other hand, the refrigerant, as regulated to a low pressure by the fixed throttle 270, flows through the check valve 129a into the outdoor heat exchanger 124. In this outdoor heat exchanger 124, the refrigerant extracts the heat of the blown air (or outside air) of the outdoor fan 124a and evaporates. The gas refrigerant having evaporated in the outdoor heat exchanger 124 flows through the solenoid valve 128a into the vapor-liquid separator 250, in which it is separated into vapor and liquid until the gas refrigerant is sucked into the intake port 122b.

Next, at the dehumidifying time, the four-way valve 123 and the solenoid valves 128a and 128c are set in the state of the dehumidifying mode of FIG. 25 by the control unit 140 so that the refrigerant flows on the route, as indicated by arrows D in FIG. 24. Specifically, the gas refrigerant, as discharged from the compressor 122, flows through the four-way valve 123 into the condenser 112 at the compartment side, in which it exchanges (or releases) the heat with the air blown from the blower 107 and condenses. Moreover, the refrigerant having flown out of the condenser 112 flows into the temperature actuated type expansion valve 260 and the fixed throttle 270 in parallel so that the refrigerant is regulated to the intermediate pressure in the temperature actuated type expansion valve 260 but to a low pressure in the fixed throttle 270.

The refrigerant, as regulated to the intermediate pressure by the temperature actuated type expansion valve 260, then flows into the water refrigerant heat exchanger 132. At this time, too, in the cooling system 138 of the heating part 133, the three-way valve 135 is controlled by the control unit 140 to open the water passage 137a at the side of the water refrigerant heat exchanger 132 and to close the water passage 137d at the side of the radiator 136 so that the cooling water flows on the route, as indicated by arrows D in FIG. 24, into the water refrigerant heat exchanger 132.

As a result, the lost calorie, as generated in the heating part 133, is cooled by the refrigerant under the intermediate pressure in the water refrigerant heat exchanger 132, and the gas refrigerant, as evaporated by this heat extraction, is sucked through the gas injection passage 122d and the check valve 129e into the gas injection port 122c.

On the other hand, the refrigerant, as regulated to the low pressure by the fixed throttle 270, flows through the check valve 129a into the outdoor heat exchanger 124, in which it extracts the heat from the blown air (or outside air) of the outdoor fan 124a and evaporates. The gas refrigerant having evaporated in the outdoor heat exchanger 124 flows through the solenoid valve 128c into the evaporator 111 because the solenoid valve 128a is closed whereas the solenoid valve 128c is open.

The refrigerant having flown into the evaporator 111 extracts the heat from the blown air of the blower 107 and evaporates. After this, the refrigerant flows into the vapor-liquid separator 250, in which it is separated into the vapor and liquid until the gas refrigerant is sucked into the intake port 122b of the compressor 122.

At the dehumidifying time, as described above, the refrigerant flows into both the evaporator 111 and the condenser 112, as disposed in the indoor air conditioner unit 100, so that the blown air of the blower 107 is at first cooled and dehumidified by the evaporator 111 and then heated again by the condenser 112. Here, the heat, as released from the refrigerant in the condenser 112, is the summation of the extraction heat of the evaporator 111 and the power consumption of the compressor 112 so that the air temperature at the outlet side of the condenser 112 is higher than the temperature of the air sucked from the inlet ports 103, 104 and 105. As a result, the heating operation can be performed simultaneously with the dehumidifying operation.

On the other hand, the lost calorie, as generated at the heat exchanger 133, is extracted in the water refrigerant heat exchanger 132 by the refrigerant under the intermediate pressure. By injecting the gas refrigerant, as evaporated by this heat extraction, into the compressor 122, the dehumidifying capacity can be effectively improved at at the heating time.

FIG. 26 is a Mollier diagram illustrating the cycle behaviors at the heating time according to the fifteenth embodiment and corresponds to FIG. 20 of the eleventh embodiment so that the heating capacity can be effectively improved by the same reasoning as that of the description of FIG. 20.

According to the fifteenth embodiment, moreover, the intermediate vapor-liquid separator 125 in the eleventh to fourteenth embodiments is replaced by the vapor-liquid separator (or accumulator) 250 connected to the intake port 122b of the compressor 122. At the cooling time, moreover, the refrigerant, as condensed by the outdoor heat exchanger 124, is neither regulated to the intermediate pressure not injected into the compressor 122 but regulated as it is under the low pressure and guided into the evaporator 111. As a result, the circuit having the check valves 129c and 129d in the eleventh to fourteenth embodiments can be eliminated to simplify the cycle piping parts.

In the fifteenth embodiment, there is provided in parallel with the fixed throttle 271 acting as the third pressure regulator means the solenoid valve 128c which is opened at the dehumidifying time to cause the refrigerant to bypass the fixed throttle 271 and to flow into the evaporator 111 thereby to prevent the pressure loss due to the fixed throttle 271. However, the third pressure regulator means may be exemplified by an electric expansion valve in place of the fixed throttle 271, so that the pressure loss by the third pressure regulator means may be prevented by forcibly keeping the electric expansion vale in a fully open state at the dehumidifying time.

The present invention having been described above is not limited to the disclosed embodiments but may be modified in various ways without departing from the spirit and scope of the invention.

What is claimed is:

1. A vehicular air conditioner system comprising:
   an air conditioning duct provided at its one end with air inlet ports and at its other end with outlet ports into a compartment of a vehicle;
   a blower disposed in said air conditioning duct for blowing air through said air conditioning duct from said inlet ports to said outlet ports;
   an indoor heat exchanger disposed in said air conditioning duct for exchanging the heat with said air;
   an outdoor heat exchanger disposed outside of said air conditioning duct for exchanging the heat between an outside air and a refrigerant;
   a first pressure regulator interposed between said indoor heat exchanger and said outdoor heat exchanger for regulating the pressure of said refrigerant;
   a compressor having an intake port for inhaling the refrigerant at the lower pressure side of a refrigerating cycle, a gas injection port for introducing the gas refrigerant under an intermediate pressure of the refrigerating cycle, and a discharge port for discharging the compressed refrigerant;
   a second pressure regulator for regulating the condensed refrigerant at a higher pressure side of the refrigerating cycle to the intermediate pressure;
   a heat exchanger adapted to receive the refrigerant under the intermediate pressure and to cause the refrigerant under the intermediate pressure to extract the heat from a beating part, as mounted on the vehicle, and to evaporate; and
   a gas injection passage for introducing the gas refrigerant, as evaporated in said heat exchanger, into said gas injection port,
   wherein there is set at least a heating mode, in which said indoor heat exchanger can act as a condenser, and a cooling mode in which said indoor heat exchanger can act as an evaporator.

2. A vehicular air conditioner system according to claim 1, wherein:
   said second pressure regulator is an expansion valve for controlling the flow rate of the refrigerant so that the refrigerant may complete the evaporation at ane exit of said heat exchanger.

3. A vehicular air conditioner system according to claim 1, wherein:
   said vehicle mounts thereon a plurality of said heating parts;
   a plurality of said heat exchangers are provided to correspond to said heating parts; and
   throttle means for controlling the evaporation temperature of the refrigerant is disposed at the exit side of said plurality of heat exchangers.

4. A vehicular air conditioner system according to claim 1, further comprising:
   a vapor-liquid separator for separating the vapor and liquid of the condensed refrigerant, as introduced, at the side of a higher pressure of the refrigerating cycle,
   wherein the liquid refrigerant, as separated in said vapor-liquid separator, is partially introduced into said first pressure regulator and into said second pressure regulator.

5. A vehicular air conditioner system comprising:
   an air conditioning duct provided at its one end with air inlet ports and at its other end with outlet ports into a compartment of a vehicle;
   a blower disposed in said air conditioning duct for blowing air through said air conditioning duct from said inlet ports to said outlet ports;
   an indoor heat exchanger disposed in said air conditioning duct for exchanging the heat with said air;
   an outdoor heat exchanger disposed outside of said air conditioning duct for exchanging the heat between the outside air and a refrigerant;
   a compressor having an intake port for inhaling the refrigerant at the lower pressure side of a refrigerating cycle, a gas injection port for introducing the gas refrigerant under an intermediate pressure of the refrigerating cycle, and a discharge port for discharging the compressed refrigerant;
   a first pressure regulator for regulating the condensed refrigerant at a higher pressure side of the refrigerating cycle to the intermediate pressure;
   a vapor-liquid separator for separating the vapor and liquid of the intermediate pressure refrigerant regulated by said first pressure regulator;
   a first gas injection passage for introducing the gas refrigerant, as separated by said vapor-liquid separator, into said gas injection port through a second pressure regulator;
   a third pressure regulator for regulating the liquid refrigerant, as separated by said vapor-liquid separator, to feed it to said indoor heat exchanger or said outdoor heat exchanger;
   a fourth pressure regulator for regulating the liquid refrigerant which is separated by said vapor-liquid separator;
   a heat exchanger adapted to receive the refrigerant, as regulated by said fourth pressure regulator, and to cause it to extract the heat from the heating part, as mounted on the vehicle, and to evaporate; and
   a second gas injection passage for introducing the gas refrigerant, as evaporated in said heat exchanger, into said gas injection port,
   wherein there is set at least a heating mode, in which said indoor heat exchanger can act as a condenser, and a cooling mode in which said indoor heat exchanger can act as an evaporator.

6. A vehicular air conditioner system according to claim 5, wherein:
   said indoor heat exchanger includes an evaporator disposed in said air conditioning air passage for cooling said air, and a condenser disposed at the downstream side of said air conditioning air passage for heating said air;

at the heating time, the refrigerant circulates through said compressor, said condenser, said first pressure regulator, said vapor-liquid separator, said third pressure regulator and said outdoor heat exchanger sequentially;

at the cooling time, the refrigerant circulates through said compressor, said outdoor heat exchanger, said first pressure regulator, said vapor-liquid separator, said third pressure regulator and said evaporator sequentially;

at the dehumidifying time, the refrigerant circulates through said compressor, said condenser, said first pressure regulator, said vapor-liquid separator, said third pressure regulator and said evaporator sequentially;

at any of the heating time, the cooling time and dehumidifying time, the gas refrigerant, as separated by said vapor-liquid separator, is introduced through said second pressure regulator via said first gas injection passage into said gas injection port; and wherein the liquid refrigerant, as separated by said vapor-liquid separator, is partially regulated by said fourth pressure regulator and then evaporated in said heat exchanger so that the evaporated gas refrigerant is introduced via said second gas injection passage into said gas injection port.

7. A vehicular air conditioner system comprising:

an air conditioning duct provided at its one end with air inlet ports and at its other end with outlet ports into a compartment of a vehicle;

a blower disposed in said air conditioning duct for blowing air through said air conditioning duct from said inlet ports to said outlet ports;

an indoor heat exchanger disposed in said air conditioning duct for exchanging the heat with said air;

an outdoor heat exchanger disposed outside of said air conditioning duct for exchanging the heat between the outside air and a refrigerant;

a compressor having an intake port for inhaling the refrigerant at the lower pressure side of a refrigerating cycle, a gas injection port for introducing the gas refrigerant under an intermediate pressure of the refrigerating cycle, and a discharge port for discharging the compressed refrigerant;

a first pressure regulator for regulating the condensed refrigerant at a higher pressure side of the refrigerating cycle to the intermediate pressure;

a heat exchanger adapted to receive the intermediate pressure refrigerant, as regulated by said first pressure regulator, and to cause it to extract the heat from the heating part, as mounted on the vehicle;

a vapor-liquid separator for separating the vapor and liquid of the refrigerant having extracted the heat in said heat exchanger;

a third pressure regulator for regulating and feeding the liquid refrigerant, as separated by said vapor-liquid separator, to said indoor heat exchanger or said outdoor heat exchanger; and a gas injection passage for introducing the gas refrigerant, as separated in said vapor-liquid separator, into said gas injection port, wherein there is set at least a heating mode, in which said indoor heat exchanger can act as a condenser, and a cooling mode in which said indoor heat exchanger can act as an evaporator.

8. A vehicular air conditioner system comprising:

an air conditioning duct provided at its one end with air inlet ports and at its other end with outlet ports into a compartment of a vehicle;

a blower disposed in said air conditioning duct for blowing air through said air conditioning duct from said inlet ports to said outlet ports;

an evaporator disposed in said air conditioning duct for cooling said air;

a condenser disposed outside of said air conditioning duct for exchanging the heat with the outside air to condense the refrigerant;

a first pressure regulator interposed between said condenser and said evaporator for regulating the pressure of said refrigerant;

a compressor having an intake port for inhaling the refrigerant at the lower pressure side of a refrigerating cycle, a gas injection port for introducing the gas refrigerant under an intermediate pressure of the refrigerating cycle, and a discharge port for discharging the compressed refrigerant;

a second pressure regulator for regulating the refrigerant, as condensed by said condenser, at a higher pressure side to the intermediate pressure;

a heat exchanger adapted to receive the refrigerant under the intermediate pressure and to cause the refrigerant under the intermediate pressure to extract the heat from a heating part, as mounted on the vehicle, and to evaporate; and a gas injection passage for introducing the gas refrigerant, as evaporated in said heat exchanger, into said gas injection port.

9. A vehicular air conditioner system according to claim 8, further comprising:

a vapor-liquid separator disposed at the exit side of said condenser for separating the vapor and liquid of the condensed refrigerant, wherein the liquid refrigerant, as separated in said vapor-liquid separator, is partially introduced into said first pressure regulator and into said second pressure regulator.

10. A vehicular air conditioner system according to claim 8, wherein:

a communication passage for causing the exit side of said heat exchanger to communicate pith said intake port is provided in parallel with said gas injection passage;

valve means for interrupting the flow of the refrigerant is disposed in said communication passage and in the refrigerant passage to said evaporator; and while the cooling mode is unused, said heating part is cooled by said heat exchanger by opening said communication passage with said valve means and by closing the refrigerant passage to said evaporator with said valve means.

11. An air conditioner system to be applied to a vehicle mounting a heating part thereon, comprising:

an air conditioning duct provided at its one end with air inlet ports and at its other end with outlet ports into a compartment of a vehicle;

a blower disposed in said air conditioning duct for blowing air through said air conditioning duct from said inlet ports to said outlet ports;

an indoor heat exchanger disposed in said air conditioning duct for exchanging the heat between the air in said air conditioning duct and the refrigerant in the refrigerating cycle;

an outdoor heat exchanger disposed outside of said air conditioning duct for exchanging the heat between the outside air and the refrigerant in said refrigerating cycle;

a compressor having an intake port for inhaling the refrigerant at the lower pressure side of a refrigerating cycle, a gas injection port for introducing the gas refrigerant under an intermediate pressure of the refrigerating cycle, and a discharge port for discharging the compressed refrigerant;

first pressure regulator means for regulating the condensed refrigerant at a higher pressure side of said refrigerating cycle to the intermediate pressure;

a vapor-liquid separator for separating the vapor and liquid of the intermediate pressure-refrigerant, as regulated by said first pressure regulator means;

a gas injection passage for introducing the gas refrigerant, as separated in said vapor-liquid separator, into said gas injection port;

second pressure regulator means for regulating the liquid refrigerant which is separated in said vapor-liquid separator; and heat exchanger means for causing said intermediate pressure refrigerant to extract the waste heat from said heating part, wherein at the heating time, the refrigerant circulates through said compressor, said indoor heat exchanger, said first pressure regulator means, said vapor-liquid separator, said second pressure regulator means and said outdoor heat-exchanger sequentially, and the gas refrigerant having extracted the waste heat from said heating part is introduced via said gas injection passage into said gas injection port.

12. A vehicular air conditioner system according to claim 11, wherein:

said indoor heat exchanger includes an evaporator disposed in said air conditioning duct for cooling said air, and a condenser disposed at the downstream side of said evaporator in said air conditioning duct for heating said air;

at the heating time, the refrigerant circulates through said compressor, said indoor heat exchanger, said first pressure regulator means, said vapor-liquid separator, said second pressure regulator means and said outdoor heat exchanger sequentially, and the gas refrigerant having extracted the waste heat from said heating part is introduced via said gas injection passage into said gas injection port;

at the cooling time, the refrigerant circulates through at least said compressor, said outdoor heat exchanger, said second pressure regulator means and said evaporator sequentially; and at the dehumidifying time, the refrigerant circulates through at least said compressor, said condenser, said second pressure regulator means and said evaporator sequentially.

13. A vehicular air conditioner system according to claim 11, wherein:

said heat exchanger means is adapted to exchange the heat between the medium, as heated by said heating part, and said intermediate pressure refrigerant.

14. A vehicular air conditioner system according to claim 13, wherein:

said heat exchanger means is disposed in said vapor-liquid separator and is adapted to exchange the heat between said medium and the liquid refrigerant in said vapor-liquid separator.

15. A vehicular air conditioner system according to claim 13, wherein:

said heat exchanger means is disposed outside of said vapor-liquid separator and is adapted to exchange the heat between said medium and the liquid refrigerant, as separated in said vapor-liquid separator.

16. A vehicular air conditioner system according to claim 13, wherein:

a closed circuit for circulating said medium at all times is provided between said heating part and said heat exchanger means.

17. A vehicular air conditioner system according to claim 13, further comprising:

a radiator connected to said heat exchanger means in parallel with said heating part; and change means for changing the flow of said medium between said heat exchanger means and said radiator, wherein at the heating time, said medium is guided to said heat exchanger means by said change means.

18. A vehicular air conditioner system according to claim 13, wherein:

said second pressure regulator means is an expansion valve for adjusting the degree of superheat of the refrigerant to be introduced into said intake port.

19. An air conditioner system to be applied to a vehicle mounting a heating part thereon, comprising:

an air conditioning duct provided at its one end with air inlet ports and at its other end with outlet ports into a compartment of a vehicle;

a blower disposed in said air conditioning duct for blowing air through said air conditioning duct from said inlet ports to said outlet ports;

an indoor heat exchanger disposed in said air conditioning duct for exchanging the heat between the air in said air conditioning duct and the refrigerant in the refrigerating cycle;

an outdoor heat exchanger disposed outside of said air conditioning duct for exchanging the heat between the outside air and the refrigerant in said refrigerating cycle;

a vapor-liquid separator for separating the vapor and liquid of the evaporated refrigerant at a lower pressure side of said refrigerating cycle;

a compressor having an intake port for inhaling the gas refrigerant, as separated by said vapor-liquid separator, a gas injection port for introducing the gas refrigerant under an intermediate pressure of the refrigerating cycle, and a discharge port for discharging the compressed refrigerant;

first pressure regulator means for regulating the condensed refrigerant at a higher pressure side of said refrigerating cycle to the intermediate pressure;

heat exchanger means for exchanging the heat between the intermediate pressure refrigerant, as regulated by said first pressure regulator means and the medium, as cooled by said heating part;

a gas injection passage for introducing the gas refrigerant, as heated to evaporate by said heat exchanger means, into said gas injection port;

second pressure regulator means arranged in parallel with said first pressure regulator means for regulating the condensed refrigerant at a higher pressure side of said refrigerating cycle;

a radiator connected to said heat exchanger means in parallel with said heating part; and change means for changing the flow of said medium to said heat exchanger means and said radiator, wherein at the heating time, said medium is guided by said change means to flow to said heat exchanger means, and the refrigerant circulates through said compressor, said indoor heat exchanger, said second pressure regulator means, said outdoor heat exchanger and said vapor-liquid separator sequentially, and wherein the refrigerant, as condensed in said indoor heat exchanger is regulated to the intermediate pressure by said first pressure regulator means so that the intermediate pressure refrigerant is heated and evaporated into the gas refrigerant by said heat exchanger means, and said gas refrigerant is introduced via said gas injection passage into said gas injection port.

20. A vehicular air conditioner system according to claim 11, wherein:

said indoor heat exchanger includes an evaporator disposed in said air conditioning duct for cooling said air, and a condenser disposed at the downstream side of said evaporator in said air conditioning duct for heating said air;

third pressure regulator means for regulating the refrigerant is disposed at the upstream side of the refrigerant flow of said evaporator;

at the heating time, said medium is caused by said change means to flow to said heat exchanger means, and the refrigerant circulates through said compressor, said indoor heat exchanger, said second pressure regulator means, said outdoor heat exchanger and said vapor-liquid separator sequentially;

at the cooling time, said medium is caused to flow to said radiator by said change means, and the refrigerant circulates through at least said compressor, said outdoor heat exchanger, said third pressure regulator means, said evaporator and said vapor-liquid separator sequentially;

at the dehumidifying time, said medium is caused to flow to said heat exchanger means by said change means, and the refrigerant circulates through at least said compressor, said condenser, said second pressure regulator means, said outdoor heat exchanger, said evaporator and said vapor-liquid separator sequentially; and at said heating time and at said dehumidifying time, the refrigerant, as condensed in said condenser is regulated to the intermediate pressure by said first pressure regulator means so that the intermediate pressure refrigerant is heated and evaporated into a gas refrigerant by said heat exchanger means, and said gas refrigerant is introduced via said gas injection passage into said gas injection port.

21. A vehicular air conditioner system according to claim 19, wherein:.

said first pressure regulator means is an expansion valve for adjusting the degree of superheat of the refrigerant to be introduced into said gas injection port.

22. An air conditioner system for an electric vehicle comprising:

an air conditioning duct provided in a vehicle for providing a conditioned air into a vehicle compartment;

a first heat exchanger disposed in said air conditioning duct for conditioning air flowing therethrough by a refrigerant supplied thereto;

a compressor having a discharge port for discharging at a high pressure the refrigerant compressed thereby, an intake port for inhaling the refrigerant at a low pressure to be compressed and a gas injection port for introducing the refrigerant under gas condition at a pressure intermediate said low pressure and said high pressure;

a gas injection passage for introducing the gas refrigerant under the gas condition into said gas injection port; and a heating part mounted in said electric vehicle for electrically controlling a running of said electric vehicle, said heating part being operatively coupled with said gas injection passage so that waste heat generated by said heating part is recovered by the refrigerant in said gas injection passage.

23. An air conditioner system according to claim 22, further comprising:

a second heat exchanger disposed outside of an connected in series relation with said first heat exchanger in said air conditioning duct;

wherein the gas injection passage is connected in parallel relation with said second heat exchanger.

24. An air conditioning system according to claim 23, further comprising:

an accumulator disposed between said second heat exchanger and said intake port of said compressor.

25. An air conditioning system according to claim 23, further comprising:

an accumulator connected in series relation with said heating part in said gas injection passage.

26. An air conditioning system according to claim 23, further comprising:

an accumulator connected in series relation with said second heat exchanger and said injection passage; and a closed passage including said heating part therein and passing through said accumulator for heat exchange in said accumulator.

* * * * *